US012567897B2

(12) United States Patent
Jeong et al.

(10) Patent No.: US 12,567,897 B2
(45) Date of Patent: Mar. 3, 2026

(54) RECONFIGURABLE INTELLIGENT SURFACE FORMING MULTIPLE RESONANCES

(71) Applicant: SAMSUNG ELECTRONICS CO., LTD., Suwon-si (KR)

(72) Inventors: Jungi Jeong, Suwon-si (KR); Yuntae Park, Suwon-si (KR); Junhwa Oh, Suwon-si (KR); Seungyoon Lee, Suwon-si (KR); Sanghyuk Wi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 18/154,604

(22) Filed: Jan. 13, 2023

(65) Prior Publication Data

US 2024/0007176 A1     Jan. 4, 2024

(30) Foreign Application Priority Data

Jun. 29, 2022     (KR) ........................ 10-2022-0079842

(51) Int. Cl.
*H04B 7/155* (2006.01)
*H01Q 15/14* (2006.01)
*H04B 7/026* (2017.01)

(52) U.S. Cl.
CPC ....... *H04B 7/15528* (2013.01); *H01Q 15/148* (2013.01); *H04B 7/026* (2013.01)

(58) Field of Classification Search
CPC .... H04B 7/15528; H04B 7/026; H04B 1/006; H04B 17/12; H04B 7/0404; H04B 1/3827;

(Continued)

(56) References Cited

U.S. PATENT DOCUMENTS 6,384,797  B1      5/2002  Schaffner et al.
6,426,722  B1 *    7/2002  Sievenpiper ........... H01Q 15/10
                                                           343/909

(Continued)

FOREIGN PATENT DOCUMENTS

CN      110165416 A      8/2019
CN      111786124 A     10/2020

(Continued)

OTHER PUBLICATIONS

International Search Report and Written Opinion of the International Searching Authority dated May 8, 2023, in connection with International Application No. PCT/KR2023/000672, 8 pages.

*Primary Examiner* — Lana N Le

(57) ABSTRACT

The present disclosure relates to a 5G communication system or a 6G communication system for supporting higher data rates beyond a 4G communication system such as long term evolution (LTE). A unit cell of a RIS includes a first conductive structure including a first element and a second element disposed under the first element; a second conductive structure including a third element and a fourth element disposed under the third element; and a switch circuit disposed between the first conductive structure and the second conductive structure. As a first RF signal from a first external device is incident on the unit cell, a second RF signal having a first resonance frequency is reflected based on electrical paths formed respectively in the first element and the third element, and a third RF signal having a second resonance frequency different from the first resonance frequency is reflected based on electrical paths formed respectively in the second element and the fourth element.

20 Claims, 14 Drawing Sheets

(58) Field of Classification Search
CPC .......... H01Q 15/148; H01Q 3/46; H01Q 5/45;
H01Q 15/147; H01Q 21/24; H01Q
15/002; H01Q 9/0407; H01Q 15/14;
H01Q 13/10; H01Q 1/50; H01Q 7/00;
H01Q 5/321; H01Q 1/22; H01Q 1/38;
H01Q 1/2208; H01Q 1/242
See application file for complete search history.

(56) References Cited

U.S. PATENT DOCUMENTS

| | | | |
|---|---|---|---|
| 6,483,481 B1 | 11/2002 | Sievenpiper et al. | |
| 9,972,905 B2 | 5/2018 | Schaffner et al. | |
| 2005/0219125 A1 | 10/2005 | Charrier et al. | |
| 2012/0299787 A1* | 11/2012 | Sakurai | H04M 1/0237 |
| | | | 343/702 |
| 2018/0048359 A1* | 2/2018 | Kim | H04M 1/0266 |
| 2021/0184362 A1 | 6/2021 | Loh et al. | |
| 2022/0052764 A1* | 2/2022 | Medra | H04B 10/614 |
| 2022/0059943 A1 | 2/2022 | Saab et al. | |
| 2023/0254031 A1* | 8/2023 | Gurelli | H04B 7/0617 |
| | | | 455/15 |
| 2023/0420869 A1* | 12/2023 | Zólomy | H01Q 15/002 |
| 2024/0222882 A1* | 7/2024 | Kaddour | H01Q 5/45 |
| 2024/0402328 A1* | 12/2024 | Tayyab | H04B 7/04 |
| 2025/0079703 A1* | 3/2025 | Ono | H01Q 15/0026 |

FOREIGN PATENT DOCUMENTS

| | | | | |
|---|---|---|---|---|
| CN | 113764900 A | 12/2021 | | |
| WO | WO-2023205662 A2 * | 10/2023 | ......... | H04B 7/04013 |

* cited by examiner

<when switch circuit is turned on>

<when switch circuit is turned off>

<in case of multi-resonance point>

RECONFIGURABLE INTELLIGENT SURFACE FORMING MULTIPLE RESONANCES

CROSS-REFERENCE TO RELATED APPLICATION

This application is based on and claims priority under 35 U.S.C. § 119 to Korean Patent Application No. 10-2022-0079842 filed on Jun. 29, 2022, in the Korean Intellectual Property Office, the disclosure of which is incorporated by reference herein in its entirety.

BACKGROUND

1. Field

The disclosure relates to a reconfigurable intelligent surface forming multiple resonances.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like, a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

When a unit cell of a reconfigurable intelligent surface (RIS) is designed such that Radio Frequency (RF) signals to be reflected from the RIS have a single-resonance frequency, a difference between a first phase of a first RF signal to be reflected when a switch circuit in the unit cell is turned on and a second phase of a second RF signal to be reflected when the switch circuit is turned off may vary depending on an incident angle of an RF signal to be incident to the unit cell.

When an incident angle of an RF signal to be incident to the RIS is not about 90 degrees, the difference between the first phase of the first RF signal and the second phase of the second RF signal may not be about 180 degrees. When the phase difference between the first RF signal and the second RF signal is less than 180 degrees, strength of a signal to be reflected from the RIS may be decreased, and there may be a problem in that communication performance between a base station and a User Equipment (UE) deteriorates.

Various embodiments of the disclosure may include a conductive structure in which RF signals to be reflected from the RIS have a multi-resonance frequency.

Additional aspects will be set forth in part in the description which follows and, in part, will be apparent from the description, or may be learned by practice of the presented embodiments.

According to various embodiments of the disclosure, a unit cell of a reconfigurable intelligent surface (RIS) may include a first conductive structure including a first element and a second element disposed under the first element, a second conductive structure including a third element and a fourth element disposed under the third element, and a switch circuit disposed between the first conductive structure and the second conductive structure. As a first Radio Frequency (RF) signal from a first external device is incident on (e.g., impinging on) the unit cell, a second RF signal having a first resonance frequency may be reflected based on electrical paths formed respectively in the first element and the third element, and a third RF signal having a second resonance frequency different from the first resonance frequency may be reflected based on electrical paths formed respectively in the second element and the fourth element. The first element and the second element are electrically coupled to each other and the third element and the fourth elements are electrically coupled to each other.

According to various embodiments of the disclosure, an RIS may include a first unit cell. The first unit cell may include a first conductive structure including a first element and a second element disposed under the first element, a second conductive structure including a third element and a fourth element disposed under the third element, and a switch circuit disposed between the first conductive structure and the second conductive structure. As an RF signal from a first external device is incident on the first unit cell, a second RF signal having a first resonance frequency may be reflected based on electrical paths formed respectively in the first element and the third element, and a third RF signal having a second resonance frequency different from the first resonance frequency may be reflected based on electrical paths formed respectively in the second element and the fourth element. The first element and the second element are electrically coupled to each other and the third element and the fourth elements are electrically coupled to each other.

According to various embodiments of the disclosure, Radio Frequency (RF) signals to be reflected from an electronic device to an external device have a multi-resonance point, thereby minimizing a phase error of the RF signals to be reflected.

According to various embodiments of the disclosure, even if a base station and/or a User Equipment (UE) moves a location thereof, an electronic device may maintain wireless communication performance without a great loss of RF signals to be reflected from the electronic device.

In addition, various effects which are directly or indirectly understood through the disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to the description of the drawings, the same or similar reference numerals may be used to refer to the same or similar elements.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure are described with reference to the accompanying drawings. However, it should be appreciated that this is not intended to limit the technological features set forth herein to particular embodiments and include various modifications, equivalents, and/or replacements of an embodiment of the disclosure.

Figure 1:
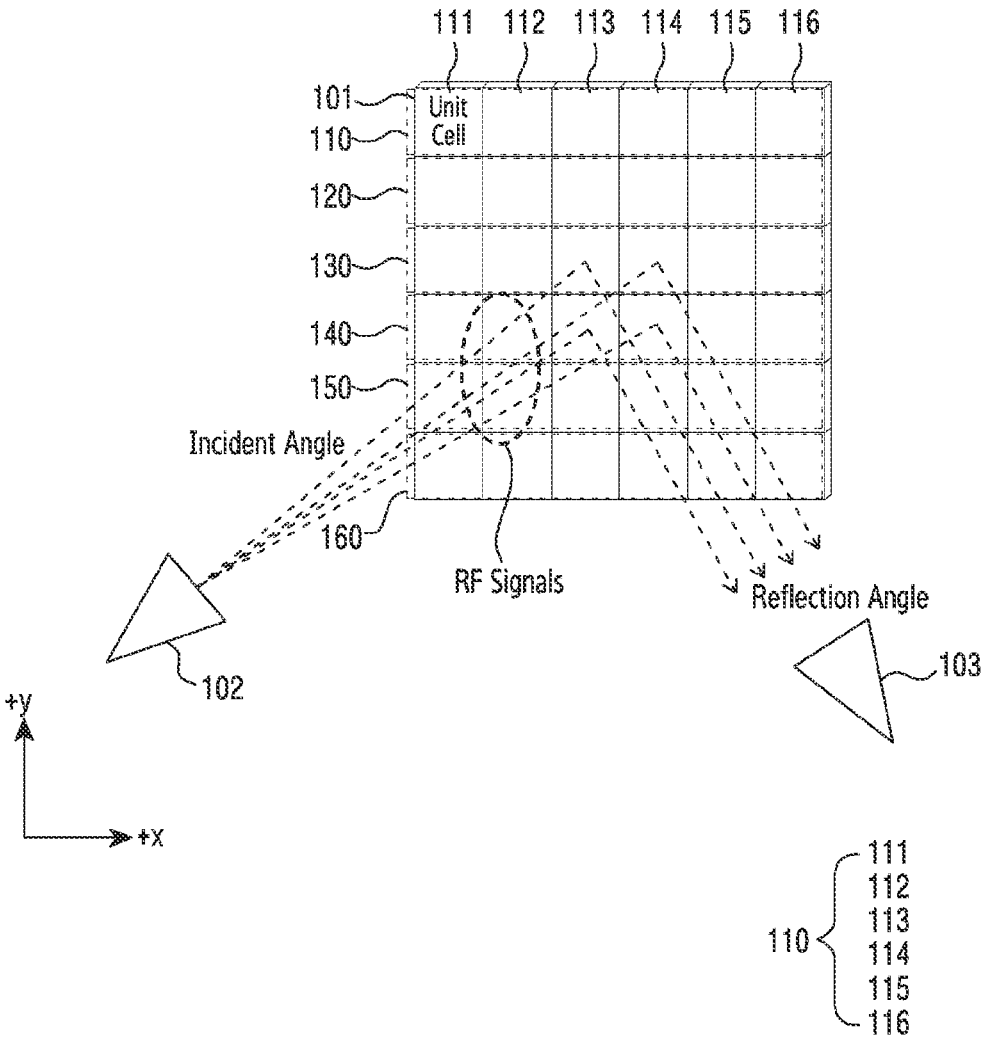
FIG. 1 illustrates a relationship among a Reconfigurable Intelligent Surface (RIS), a first external device, and a second external device according to an embodiment.

FIG. 1 illustrates a relationship among a Reconfigurable Intelligent Surface (RIS), a first external device, and a second external device according to an embodiment.

Referring to FIG. 1, an RIS 101 according to an embodiment may include a plurality of unit cells. In an embodiment, the RIS 101 may be implemented such that the plurality of unit cells are arranged. For example, the RIS 101 may include a first unit cell 111, a second unit cell 112, a third unit cell 113, a fourth unit cell 114, a fifth unit cell 115, and/or a sixth unit cell 116. In an example, the first unit cell 111, the second unit cell 112, the third unit cell 113, the fourth unit cell 114, the fifth unit cell 115, and the sixth unit cell 116 may be arranged in a row.

According to an embodiment, the first unit cell 111, the second unit cell 112, the third unit cell 113, the fourth unit cell 114, the fifth unit cell 115, and the sixth unit cell 116, which are arranged in the row, may form a first array 110. In an embodiment, the RIS 101 may include a second array 120, a third array 130, a fourth array 140, a fifth array 150, and/or a sixth array 160, which are substantially identical to the first array 110. Consequently, with the arrangement of the first array 110, the second array 120, the third array 130, the fourth array 140, the fifth array 150, and the sixth array 160, the RIS 101 may be formed or implemented to have an array of a 6×6 unit cell.

According to an embodiment, a first external device 102 may transmit a Radio Frequency (RF) signal to the RIS 101. RF signals incident from the first electronic device 102 towards the RIS 101 may be transmitted towards a second electronic device 103 by being reflected from the RIS 101. For example, the RF signals may be incident from the first external device 102 to the RIS 101 with a specific incident angle, and may be reflected to the second external device 103 with a specific reflection angle.

According to an embodiment, the first external device 102 may correspond to a base station (e.g., eNodeB, gNodeB). The second electronic device 103 may correspond to a User Equipment (UE). In an embodiment, RF signals transmitted by the first external device 102 to the RIS 101 (or RF signals incident from the first electronic device 102 to the RIS 101) may correspond to signals of a specific frequency band (e.g., over 24.25 GHz).

According to an embodiment, since RF signals incident from the first external device 102 are transmitted to the second external device 103 by being reflected from the RIS 101, the second external device 103 may minimize a signal loss. For example, when the RF signals are not reflected from the RIS 101, the RF signals may not be forwarded from the first external device 102 to the second external device 103 due to a communication environment or an obstacle between the first external device 102 and the second external device 103. In particular, when the RF signals are signals of a specific frequency band (e.g., over 24.25 GHz), the RF signals may be blocked by an obstacle according to a frequency characteristic. On the other hand, when the RIS 101 according to an embodiment is disposed between the first external device 102 and the second external device 103 and when the RIS 101 reflects to the second electronic device 103 a signal transmitted by the first external device 102, signal blocking caused by the obstacle may be minimized. Consequently, the RF signals may be forwarded from the first external device 102 to the second external device 103 with a low loss rate.

Although it is described in FIG. 1 of the disclosure that the RIS 101 reflects to the second external device 103 (e.g., a UE) an RF signal incident from the first external device 102 (e.g., a base station), this is only an example. In another embodiment, the RIS 101 may reflect to the first external device 102 (e.g., the base station) an RF signal incident from the second external device 103 (e.g., the UE).

Although it is described in FIG. 1 of the disclosure that the RIS 101 has an array of a 6×6 unit cell, this is only an example, and the RIS 101 may have an array of various unit cells in another embodiment. For example, the RIS 101 may have an array of 8×6 unit cells. In addition, although it is described in FIG. 1 of the disclosure that the RIS 101 has square unit cells, this is only an example, and the RIS 101 may include unit cells of various sizes and/or shapes in another embodiment. For example, in another embodiment, a first unit cell and second unit cell included in the RIS 101 may have different sizes, and the first unit cell and the second unit cell may have different shapes.

The RIS 101 of the disclosure may be replaced with an RIS apparatus (or an RIS device) or an electronic device. In addition, the RIS 101 of the disclosure may be replaced with an RIS reflector and/or an RIS plate. Although it is described in the disclosure that unit cells arranged in a horizontal direction (e.g., an x-axis direction) form one array and a plurality of arrays form the RIS 101 with reference to FIG. 1, this is only to set a criterion for convenience of description. Therefore, it may be described in the disclosure that unit cells arranged in a vertical direction (e.g., a y-axis direction) form one array and a plurality of arrays in the vertical direction form the RIS 101 with reference to FIG. 1. In addition thereto, the concept of the array formed by the unit cells of the disclosure is for convenience of description and does not limit the disclosure. Without the concept of the array, it may be described as the concept in which unit cells arranged according to a specific column and row form one RIS 101. In addition, although it is described in the disclosure that the plurality of unit cells form the RIS 101, this is only an example, and the RIS 101 may be formed only with one unit cell in another embodiment.

Although the concept in which the unit cells are arranged to implement or form the RIS 101 is described in the disclosure with reference to FIG. 1, it may also be described as the concept in which the RIS 101 includes at least one unit cell (e.g., the first unit cell 111, the second unit cell 112).

Figure 2:
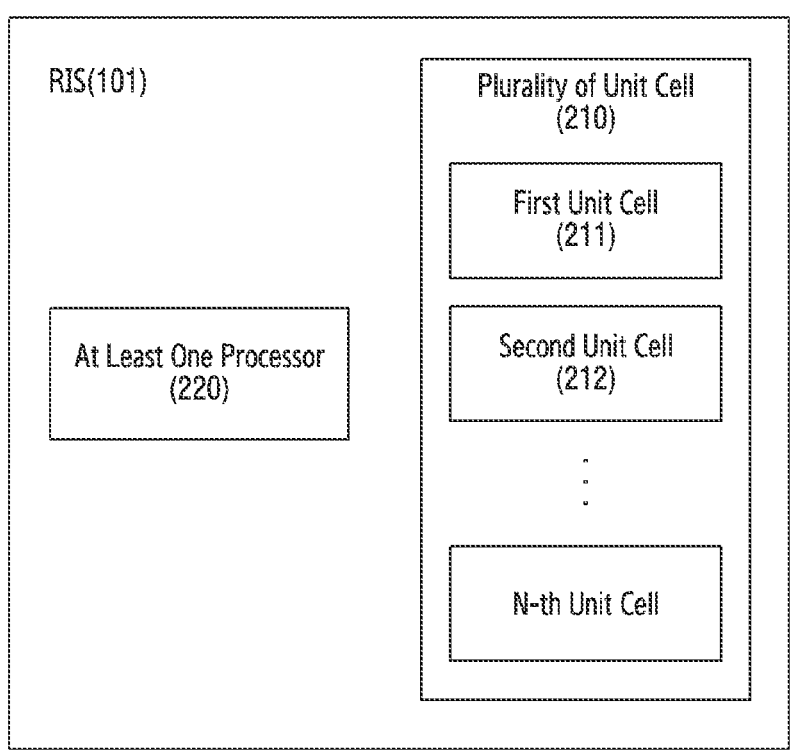
FIG. 2 illustrates an RIS according to an embodiment.

FIG. 2 illustrates an RIS according to an embodiment.

Referring to FIG. 2, the RIS 101 according to an embodiment may include a plurality of unit cells 210 and/or at least one processor 220. In an embodiment, the plurality of unit cells 210 may include a first unit cell 211, a second unit cell 212, . . . , an N-th unit cell.

According to an embodiment, the at least one processor 220 may be electrically coupled to the plurality of unit cells 210. In an embodiment, the at least one processor 220 may control an operation of a component in the plurality of unit cells 210. For example, each of the plurality of unit cells 210 may include a switch circuit for adjusting a phase of a signal to be reflected from the unit cell. In an embodiment, the at least one processor 220 may control the phase of the signal to be reflected from the unit cell by controlling the switch circuit, and as a result, may control a direction of RF signals to be reflected. In an embodiment, the at least one processor 220 may include a communication processor and/or an application processor.

Although it is described in FIG. 2 of the disclosure that the at least one processor 220 is included in the RIS 101, this is only an example. In another embodiment, the at least one processor 220 may be included in the first unit cell 211. In addition, although not illustrated in FIG. 2 of the disclosure, the RIS 101 may further include a memory and/or a transceiver.

Figure 3:
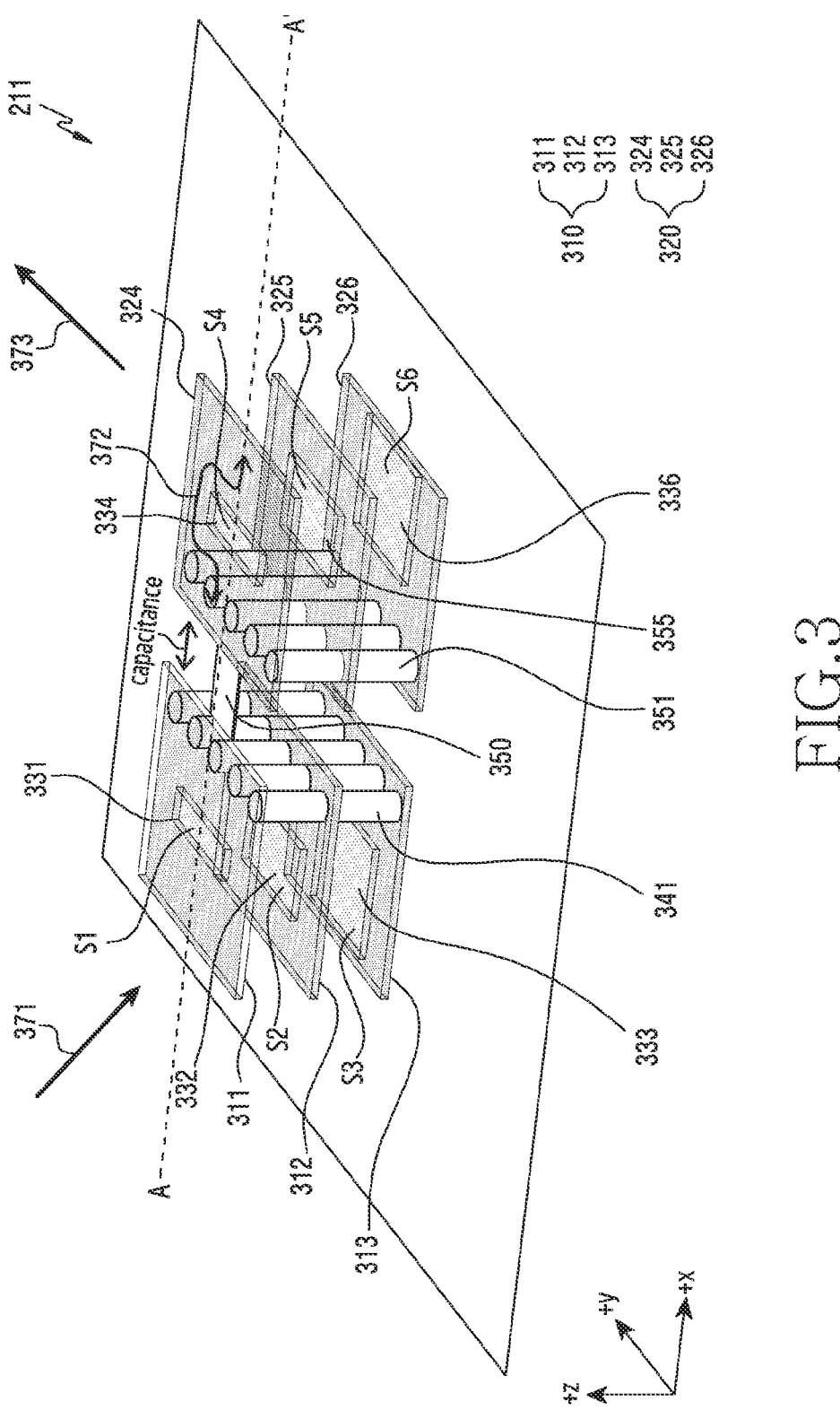
FIG. 3 illustrates a first unit cell of an RIS according to an embodiment.

FIG. 3 illustrates a first unit cell of an RIS according to an embodiment.

Referring to FIG. 3, the first unit cell 211 according to an embodiment may include a first conductive structure 310, a second conductive structure 320, first conductive vias 341, second conductive vias 351, and/or a first switch circuit 350.

According to an embodiment, the first conductive structure 310 may include a plurality of elements. For example, the first conductive structure 310 may include a first element 311, a second element 312, and a third element 313. In another embodiment, the first conductive structure 310 may include two elements. For example, the first conductive structure 310 may include the first element 311 and the second element 312.

According to an embodiment, the second element 312 may be located in a downward direction (e.g., a –z direction) of the first element 311. The third element 313 may be located in a downward direction (e.g., the –z direction) of the second element 312. Although it is described in FIG. 3 that the first element 311, the second element 312, and the third element 313 have substantially the same (or, identical) size, this is only an example. In another embodiment, the first element 311, the second element 312, and/or the third element 313 may have different sizes.

According to an embodiment, the second conductive structure 320 may include a plurality of elements. For example, the second conductive structure 320 may include a fourth element 324, a fifth element 325, and a sixth element 326. In another embodiment, the second conductive structure 320 may include two elements. For example, the second conductive structure 320 may include the fourth element 324 and the fifth element 325.

According to an embodiment, the fifth element 325 may be located in a downward direction (e.g., the –z direction) of the fourth element 324. The sixth element 326 may be located in a downward direction (e.g., the –z direction) of the fifth element 325. Although it is described in FIG. 3 that the fourth element 324, the fifth element 325, and the sixth element 326 have substantially the same size, this is only an example. In another embodiment, the fourth element 324, the fifth element 325, and/or the sixth element 326 may have different sizes.

According to an embodiment, the first element 311, the second element 312, the third element 313, the fourth element 324, the fifth element 325, and/or the sixth element 326 may correspond to a conductive patch. However, this is only an example, and elements included in the first conductive structure 310 and second conductive structure 320 may correspond to various types of conductive structure in addition to the conductive patch.

According to an embodiment, the elements included in the first conductive structure 310 may be electrically coupled to each other through the first conductive vias 341. For example, the first element 311, the second element 312, and/or the third element 313 may be electrically coupled to each other through the first conductive vias 341. In an embodiment, a first end of the first conductive vias 341 penetrating the second element 312 may be in contact with the first element 311, and a second end opposite to the first end may be in contact with the third element 313.

According to an embodiment, the elements included in the second conductive structure 320 may be electrically coupled to each other through the second conductive vias 351. For example, the fourth element 324, the fifth element 325, and/or the sixth element 326 may be electrically coupled to each other through the second conductive vias 351. In an embodiment, a third end of the second conductive vias 351 penetrating the fifth element 325 may be in contact with the fourth element 324, and a fourth end opposite to the third end may be in contact with the sixth element 326.

According to an embodiment, at least one slot may be formed in the elements of the first conductive structure 310. For example, a first slot 331 may be formed in the first element 311. A second slot 332 may be formed in the second element 312. A third slot 333 may be formed in the third element 313. In an embodiment, the first slot 331, the second slot 332, and the third slot 333 may have different sizes. For example, the first slot may have a first size S1. The second slot 332 may have a second size S2. The third slot 333 may have a third size S3. In an example, the first size S1 may be less than the second size S2. The second size S2 may be less than the third size S3.

The slot described in FIG. 3 is a term used to designate a portion pierced or recessed in a specific object, and may be replaced with substantially the same or similar term. For example, the slot described in FIG. 3 may be replaced with a hole, an opening, and/or a pit. For example, the first slot 331 may be replaced with a first hole. As another example, the first slot 331 may be replaced with a first opening.

Although an embodiment in which the first size S1 of the first slot 331, the second size S2 of the second slot 332, and the third size S3 of the third slot 333 are increased in that order is described in FIG. 3, this is only an example. In another embodiment, the first size S1, the second size S2, and the third size S3 may be decreased in that order. In another embodiment, the first size S1 may be greater than the second size S2. The first size S1 may be less than the third size S3.

According to an embodiment, at least one slot may be formed in the elements of the second conductive structure 320. For example, a fourth slot 334 may be formed in the fourth element 324. A fifth slot 335 may be formed in the fifth element 325. A sixth slot 336 may be formed in the sixth element 326. In an embodiment, the fourth slot 334, the fifth slot 335, and the sixth slot 336 may have different sizes. For example, the first slot may have a fourth size S4. The fifth slot 335 may have a fifth size S5. The sixth slot 336 may have a sixth size S6. In an example, the fourth size S4 may be less than the fifth size S5. The fifth size S5 may be less than the sixth size S6.

Although an embodiment in which the fourth size S4 of the fourth slot 334, the fifth size S5 of the fifth slot 335, and the sixth size S6 of the sixth slot 336 are increased in that order is described in FIG. 3, this is only an example. In another embodiment, the fourth size S4, the fifth size S5, and the sixth size S6 may be decreased in that order. In another embodiment, the fourth size S4 may be greater than the fifth size S5. The fourth size S4 may be less than the sixth size S6.

According to an embodiment, the first switch circuit 350 may be disposed between the first conductive structure 310 and the second conductive structure 320. For example, the first switch circuit 350 may be disposed between the first element 311 and the fourth element 324. In an embodiment, the first switch circuit 350 may include at least one switch.

According to an embodiment, the first switch circuit 350 may electrically couple the first conductive structure 310 and the second conductive structure 320. For example, the at least one processor 220 may be electrically coupled to the first switch circuit 350. The at least one processor 220 may control the first switch circuit 350 so that the first conductive structure 310 and the second conducive structure 320 are electrically coupled.

According to an embodiment, the first switch circuit 350 may electrically couple the first element 311 of the first conductive structure 310 and the fourth element 324 of the second conductive structure 320. The first conductive structure 310 may be electrically coupled through the first conductive vies 341. The second conductive structure 320 may be electrically coupled through the second conductive vias 351. Consequently, elements of the first conductive structure 310 and elements of the second conducive structure 320 may be electrically coupled through the first switch circuit 350.

According to an embodiment, first RF signals 371 may be incident from the first external device 102 (e.g., a base station) to the first unit cell 211 of the RIS 101. In an embodiment, at least one electrical path (e.g., an electrical path 372) may be formed in the first conductive structure 310 and the second conductive structure 320 by the first RF signals 371. In an embodiment, second RF signals 373 may be formed based on at least one electrical path (e.g., the electrical path 372), and the formed second RF signals 373 may be reflected to the second external device (e.g., a UE).

According to an embodiment, the second RF signals 373 having a multi-resonance frequency may be reflected by the first conductive structure 310 and the second conductive structure 320. For example, as the first RF signals 371 from the first external device 102 are incident on the first unit cell 211, RF signals having a first resonance frequency may be reflected based on electrical paths formed respectively in the first element 311 and the fourth element 324. In an example, as the first RF signals 371 are incident on the first unit cell 211, RF signals having a second resonance frequency may be reflected based on electrical paths formed respectively in the second element 312 and the fifth element 325. In an example, as the first RF signals 371 are incident on the first unit cell 211, RF signals having a third resonance frequency may be reflected based on electrical paths formed respectively in the third element 313 and the sixth element 326. Consequently, the second RF signals 373 having the multi-resonance frequency may be reflected from the first conductive structure 310 and the second conductive structure 320 by the first RF signals 371 incident to the first unit cell 211.

The expression of being "incident" or "reflected" may be replaced with being "transmitted" or "forwarded". For example, the first RF signals 371 may be transmitted or forwarded from the first external device 102 (e.g., the base station) to the first unit cell 211 of the RIS 101. As another example, the second RF signals 373 formed based on at least one electrical path (e.g., the electrical path 372) may be transmitted or forwarded to the second external device 103 (e.g., the UE).

According to an embodiment, the at least one processor 220 may control the first switch circuit 350 to control a phase of the second RF signals 373 reflected from the first unit cell 211 to the second external device 103. For example, the at least one processor 220 may control the first switch circuit 350 so that the first conductive structure 310 and the second conductive structure 320 are not electrically coupled. In an example, the second RF signals 373 to be reflected to the second external device 103 may have a first phase.

As another example, the at least one processor 220 may control the first switch circuit 350 so that the first conductive structure 310 and the second conductive structure 320 are electrically coupled. In an example, since the first conductive structure 310 and the second conductive structure 320 are electrically coupled, the second RF signals 373 to be reflected to the second external device 103 may have a second phase. In an example, the second phase may be different from the first phase. For example, the second phase may be different from the first phase by about 180 degrees.

According to an embodiment, the at least one processor 220 may control the first switch circuit 350 to control a phase of RF signals to be reflected from the RIS 101. Consequently, the at least one processor 220 may adjust a reflection direction of RF signals to be reflected through the control of the phase.

Although FIG. 3 of the disclosure has been described based on the first unit cell 211, this is only an example for convenience of description. Therefore, the description of FIG. 3 is not limited to the first unit cell 211. For example, the description of FIG. 3 may be applied to at least one unit cell. For example, the description of FIG. 3 may also be applied to the second unit cell 212.

Although it is described in FIG. 3 of the disclosure that the first conductive structure 310 and the second conductive structure 320 are electrically coupled through the first switch circuit 350, this is only an example. In another embodiment, the RIS 101 or the first unit cell 211 may include a first switch circuit which electrically couples the first element 311 and the fourth element 324, a second switch circuit which electrically couples the second element 312 and the fifth element 325, and a third switch circuit which electrically couples the third element 313 and the sixth element 326. For example, the first switch circuit may be turned on under the control of the at least one processor 220, and the first element 311 and the fourth element 324 may be electrically coupled. In an example, the second switch circuit may be turned on, and the second element 312 and the fifth element 325 may be electrically coupled. In an example, the third switch circuit may be turned on, and the third element 313 and the sixth element 326 may be electrically coupled. The first conductive structure 310 may be inter-coupled, and the second conductive structure 320 may be inter-coupled. Consequently, all of elements of the first conductive structure 310 and elements of the second conductive structure 320 may be electrically coupled through the first switch circuit, the second switch circuit, and the third switch circuit.

As another example, the first switch circuit may be turned off under the control of the at least one processor 220, and the first element 311 and the fourth element 324 may not be electrically coupled. In an example, the second switch circuit may be turned off, and the second element 312 and the fifth element 325 may not be electrically coupled. In an example, the third switch circuit may be turned off, and the third element 313 and the sixth element 326 may not be electrically coupled. Consequently, since the first switch circuit, the second switch circuit, and the third switch circuit are turned off, elements of the first conductive structure 310 may not be electrically coupled to elements of the second conductive structure 320.

A conductive structure of the disclosure may be referred to as a hardware component. The conductive structure of the disclosure may be referred to as a component including a conductive material.

The conductive structure of the disclosure may be replaced with various terms referring to an object including the conductive material. For example, the conductive structure may be replaced with a conductive plate, a conductive patch, or a reflector including the conductive material. As another example, the conductive structure may be replaced with an antenna or a radiator.

An element included in the conductive structure of the disclosure may be referred to as a hardware component. The element of the disclosure may be referred to as a component including the conductive material.

The element of the disclosure is included in the conductive structure, and may be replaced with various terms referring to an object including the conductive material. For example, a first element included in a first conductive structure may be replaced with a first conductive plate, a first conductive patch, or a first reflector including the conductive material. As another example, the element may be replaced with an antenna element or a radiator.

Although it has been described that elements described in FIG. 3 of the disclosure have a rectangular patch shape, this is only an example. The elements described in FIG. 3 may have various shapes. For example, the elements may have various shapes such as a triangle, a circle, a trapezoid, an ellipse, or a polygon. For example, the first element 311 included in the first conductive structure 310 may have a circular shape.

In addition, each of the elements of the disclosure may have a different shape. For example, the first element 311 included in the first conductive structure 310 may have a circular shape, and the second element 312 may have a rectangular shape. For example, the first element 311 included in the first conductive structure 310 may have a circular shape, and the fourth element 324 included in the second conductive structure 320 may have a rectangular shape.

Figure 4:
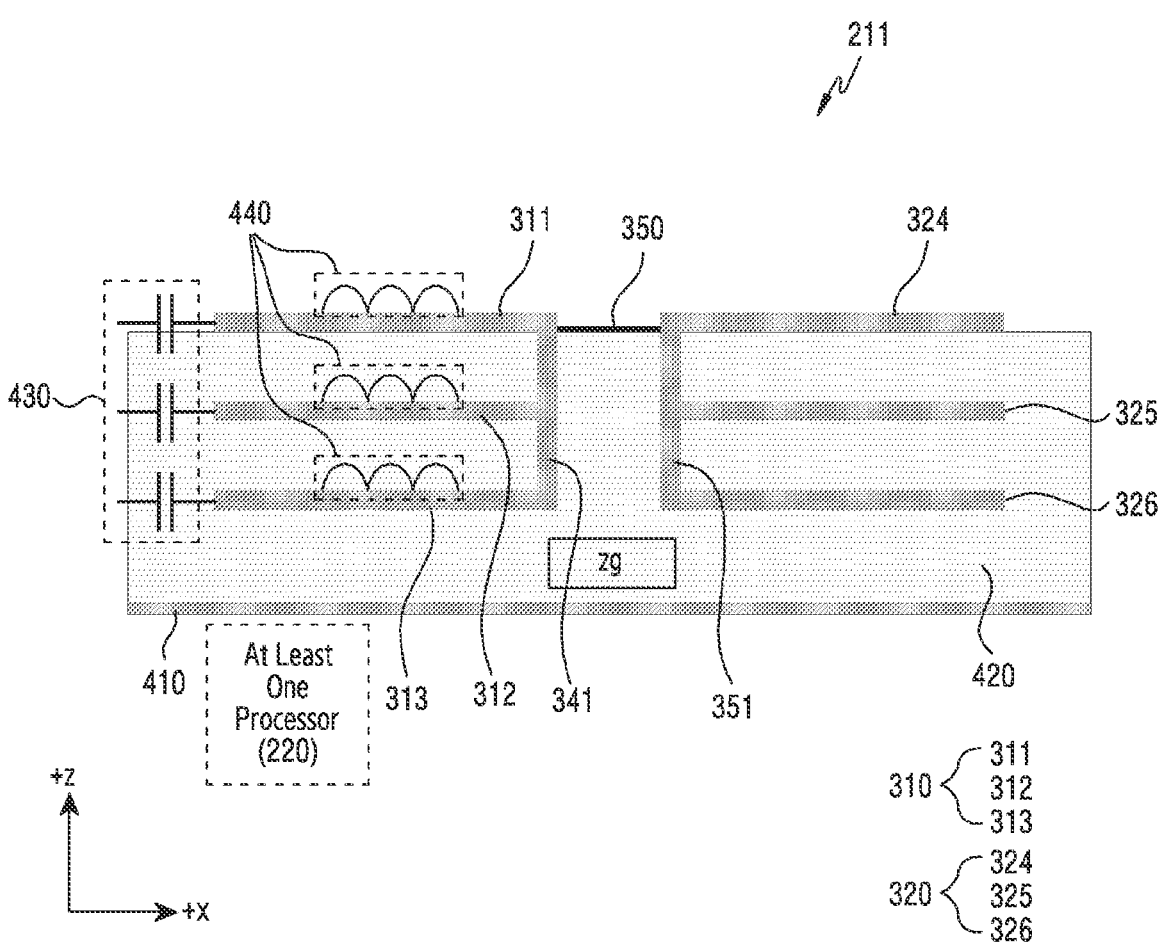
FIG. 4 illustrates a cross section A-A' of a first unit cell according to an embodiment.

FIG. 4 illustrates a cross section A-A' of a first unit cell according to an embodiment.

Referring to FIG. 4, the first unit cell 211 according to an embodiment may include a ground 410 and a dielectric 420 to which the first conductive structure 310 and the second conductive structure 320 are disposed.

According to an embodiment, the ground 410 may include a conductive material. The at least one processor 220 may be disposed on one face of the ground 410. In an embodiment, the at least one processor 220 may be electrically coupled to the first switch circuit 350. The at least one processor 220 may control the first switch circuit 350 so that the first conductive structure 310 and the second conductive structure 320 are electrically coupled or electrically decoupled. For example, when the first switch circuit 350 is turned on (or short-circuited), the first conductive structure 310 and the second conductive structure 320 may be electrically coupled. As another example, when the first switch circuit 350 is turned off (or open-circuited), the first conductive structure 310 and the second conductive structure 320 may be electrically decoupled.

According to an embodiment, the first conductive structure 310 may be sequentially disposed in a first direction (e.g., a +z direction). For example, the first element 311 may be located in a first direction (e.g., the +z direction) of the second element 312, and the second element 312 may be located in a first direction (e.g., the +z direction) of the third element 313. In an embodiment, the second conductive structure 320 may be disposed sequentially in the first direction (e.g., the +z direction). For example, the fourth element 324 may be located in a first direction (e.g., the +z direction) of the fifth element 325, and the fifth element 325 may be located in a first direction (e.g., the +z direction) of the sixth element 326.

According to an embodiment, the first conductive structure 310 and/or the second conductive structure 320 may be disposed at least in part inside the dielectric 420 or on the dielectric 420. For example, the first element 311 and the fourth element 324 may be disposed on the dielectric 420. As another example, the second element 312, the third element 313, the fifth element 325, and the sixth element 326 may be disposed inside the dielectric 420. In an embodiment, the dielectric 420 may have a specific permittivity Zg.

In another embodiment, both the first conductive structure 310 and the second conductive structure 320 may be disposed inside the dielectric 420.

According to an embodiment, a resonance frequency of an RF signal to be reflected to the second external device 103 may vary depending on the permittivity Zg of the dielectric 420.

According to an embodiment, a capacitance component 430 is to represent capacitance formed between the first conductive structure 310 of the first unit cell 211 and a conductive structure of a unit cell adjacent to the first unit cell 211. In addition, the inductance component 440 is to represent inductance formed in the first element 311, the second element 312, and the third element 313. Although only an inductance component of the first conductive structure 310 is illustrated in FIG. 3, this is for convenience of description, and the second conductive structure 320 may also include the inductance component.

Figure 5A:
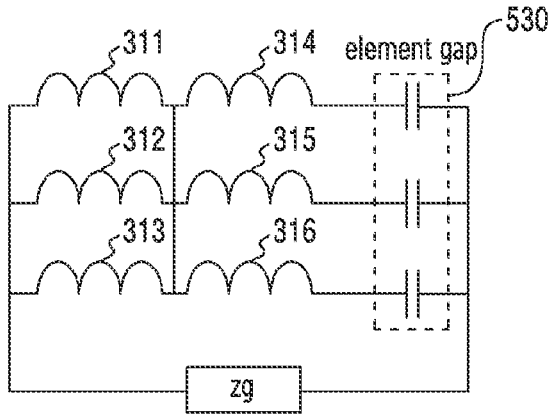
FIG. 5A illustrates an equivalent circuit diagram of a first unit cell when a switch circuit is in an ON state according to an embodiment.
Figure 5B:
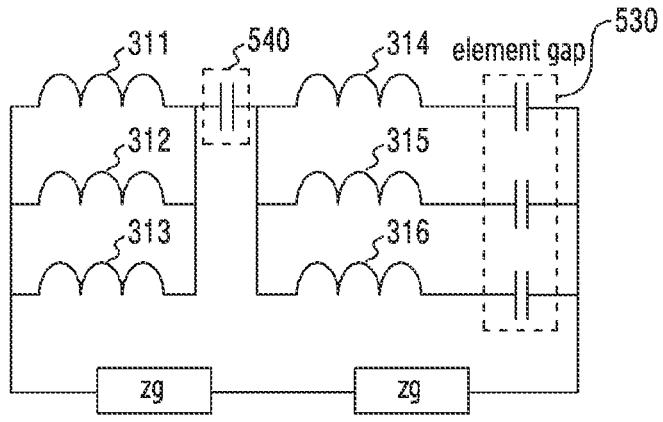
FIG. 5B illustrates an equivalent circuit diagram of a first unit cell when a switch circuit is in an OFF state according to an embodiment.

FIGS. 5A and 5B illustrate an equivalent circuit diagram of a first unit cell depending on the on/off state of a switch circuit according to an embodiment. Particularly, FIG. 5A illustrates the equivalent circuit diagram of a first unit cell when a switch circuit is in an ON state according to an embodiment. FIG. 5B illustrates an equivalent circuit diagram of a first unit cell when a switch circuit is in an OFF state according to an embodiment.

Referring to FIG. 5A and FIG. 5B, an equivalent circuit diagram of the first unit cell 211 is illustrated when the first switch circuit 350 according to an embodiment is turned on (or short-circuited) so that the first conductive structure 310 and the second conductive structure 320 are electrically coupled. The first element 311, the second element 312, the third element 313, the fourth element 324, the fifth element 325, and the sixth element 326 may be represented by an inductance component. In addition, a capacitance component between elements of the first unit cell 211 and elements of a unit cell adjacent to the first unit cell 211 may be explained as the first capacitance component 530. A permittivity of the dielectric 420 may be represented by Zg.

An equivalent circuit diagram of the first unit cell 211 is illustrated when the first switch circuit 350 according to an embodiment is turned off (or open-circuited) and thus the first conductive structure 310 and the second conductive structure 320 are not electrically coupled. A capacitance component between elements of the first unit cell 211 and elements of a unit cell adjacent to the first unit cell 211 may be explained as the first capacitance component 530. The first element 311, the second element 312, the third element 313, the fourth element 324, the fifth element 325, and the sixth element 326 may be explained as an inductance component. A capacitance component between the first conductive structure 310 and the second conductive structure 320 may be represented by a second capacitance component 540.

Figure 6:
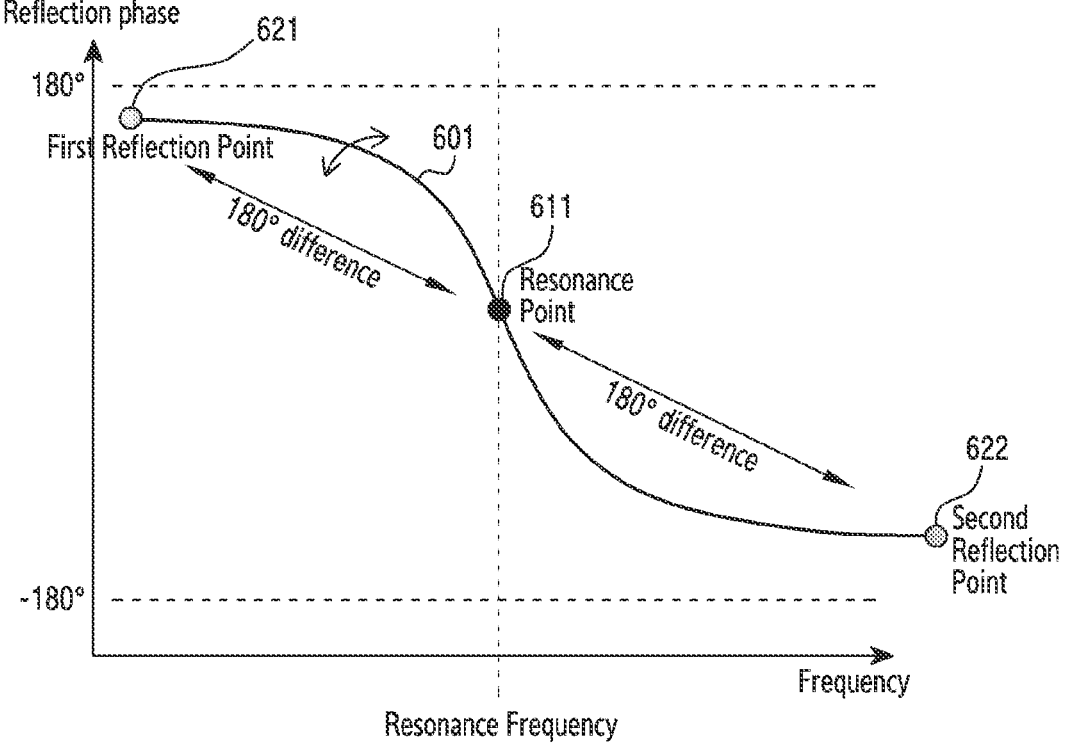
FIG. 6 illustrates a reflection phase of an RF signal to be reflected by an RIS according to an embodiment.

FIG. 6 illustrates a reflection phase of an RF signal to be reflected by an RIS according to an embodiment.

Referring to FIG. 6, a first graph 601 according to an embodiment is a graph of a reflection phase graph depending on a frequency of a second RF signal to be reflected from the RIS 101 when a first RF signal is incident from the first external device 102.

According to an embodiment, the second RF signal to be reflected from the RIS 101 may have a reflection phase of about 0 degrees and may have a resonance frequency corresponding to a resonance point 611. For example, assuming a case where an additional conductor structure does not exist in the RIS 101, a reflection phase of the second RF signal to be reflected from the RIS 101 when the first RF signal is incident from the first external device 102 may have a phase of about 180 degrees or about −180 degrees. In an embodiment, a point at which the second RF signal has a reflection phase of about 180 degrees may be referred to as a first reflection point 621, and a point at which the second RF signal has a phase of about −180 degrees may be referred to as a second reflection point 622. On the other hand, the RIS 101 according to an embodiment may include the first conductive structure 310 and the second conductive structure 320, and each of elements of the first conductive structure 310 and second conductive structure 320 may be designed such that the second RF signal to be reflected has a signal of a specific frequency band (e.g., 28 GHz). Consequently, a phase of the second RF signal to be reflected from the RIS 101 may have a phase of 0 degrees, and may have a resonance frequency corresponding to the resonance point 611.

According to an embodiment, the resonance point 611 may be located between the first reflection portion 621 and the second reflection point 622. In an embodiment, the resonance point 611 may be adjusted in such a manner that conductor structures (e.g., the first conductive structure 310 and the second conductive structure 320) of a unit cell (e.g., the first unit cell 211) included in the RIS 101 are designed differently.

Figure 7A:
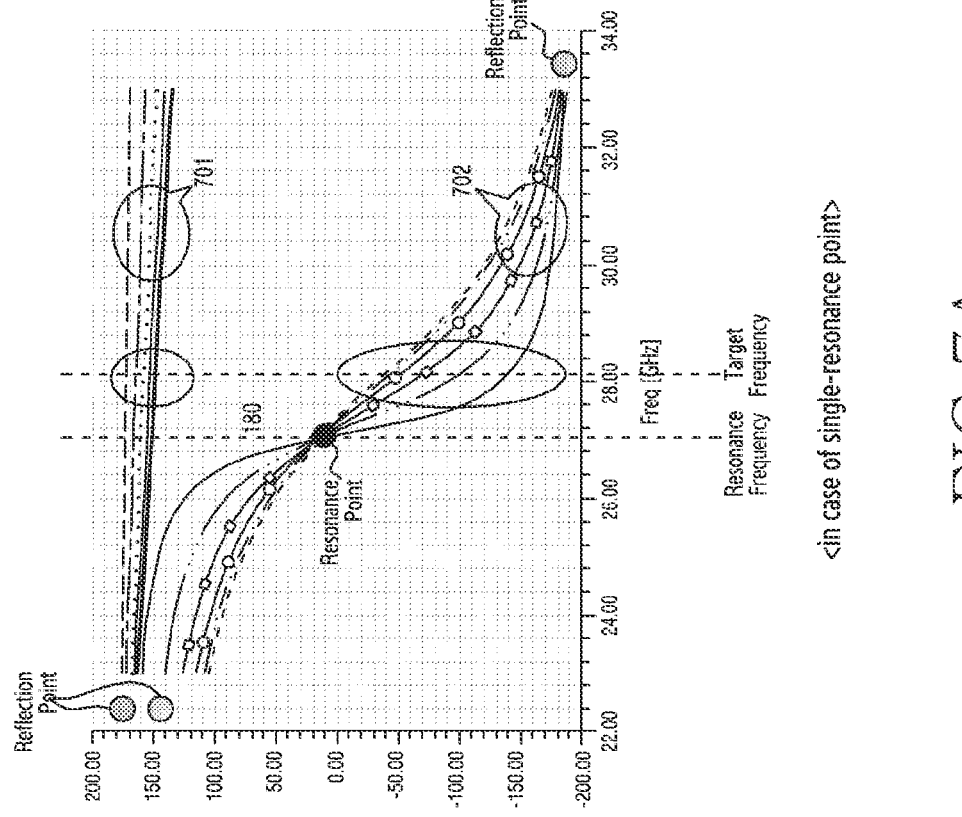
FIG. 7A illustrates a reflection phase graph of a unit cell designed to have a single-resonance point according to an embodiment.
Figure 7B:
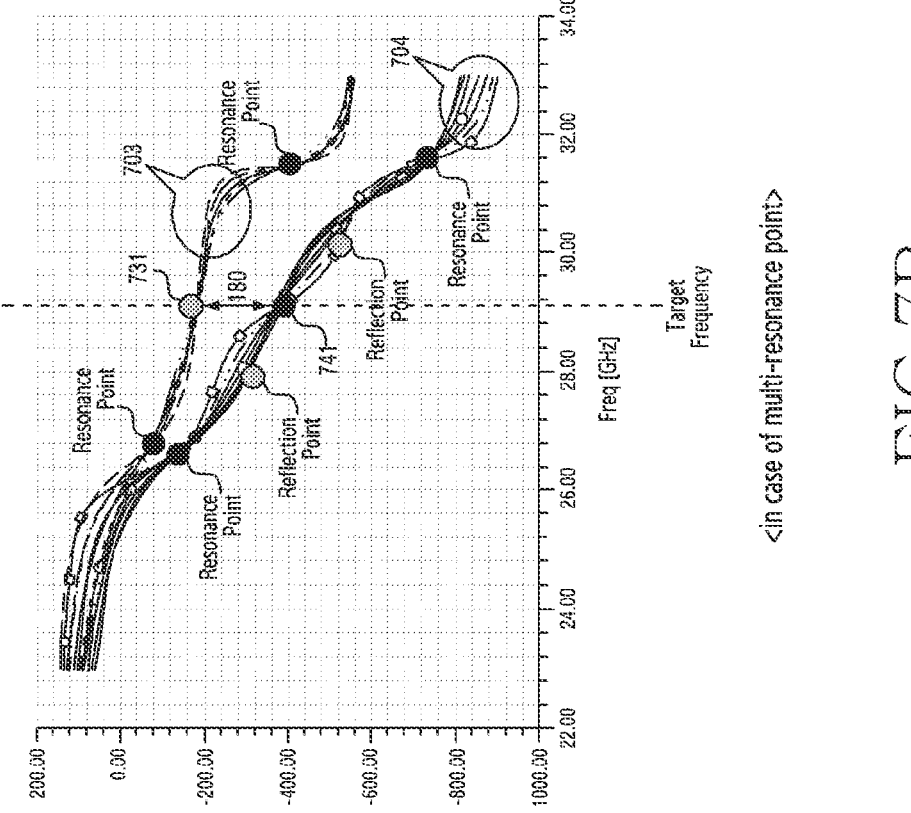
FIG. 7B illustrates a reflection phase graph of a first unit cell designed to have a multi-resonance point according to an embodiment.

FIGS. 7A and 7B are views for comparing a reflection phase graph of a unit cell designed to have a single-resonance point and a reflection phase graph of a first unit cell designed to have a multi-resonance point according to an embodiment. Particularly, FIG. 7A illustrates a reflection phase graph of a unit cell designed to have a single-resonance point according to an embodiment. FIG. 7B illustrates a reflection phase graph of a first unit cell designed to have a multi-resonance point according to an embodiment.

Referring to FIG. 7A and FIG. 7B, reflection phase graphs depending on a frequency are illustrated when a unit cell according to an embodiment is designed such that an RF signal to be reflected from the unit cell has a single-resonance point. In an embodiment, reflection phase graphs of RF signals may be illustrated variously according to an incident angle of an RF signal to be incident to the RIS 101. For example, first graphs 701 are reflection phase graphs of RF signals to be reflected from the RIS 101 when a switch circuit of a unit cell having a single-resonance point is turned on. In an example, a plurality of reflection phase graphs are illustrated depending a change in incident angles of RF signals to be incident upon the RIS 101.

As another example, second graphs 702 are reflection phase graphs of RF signals to be reflected from the RIS 101 when a switch circuit of a unit cell is turned off. In an example, a plurality of reflection phase graphs are illustrated depending a change in incident angles of RF signals to be incident to the RIS 101.

According to an embodiment, the first graphs 701 are illustrated with various variations at a target frequency (e.g., about 28 GHz). Likewise, the second graphs 702 are illustrated with various variations at a target frequency (e.g., about 28 GHz). In an embodiment, in order to adjust a reflection direction of second RF signals by adjusting a phase of the second RF signals to be reflected from the RIS, the first graphs 701 and the second graphs 702 may have to be different by about 180 degrees. However, since each of the first graphs 701 and the second graphs 702 has a great variation depending on an incident angle for the incidence to the RIS 101, it may be difficult for the graphs to have a difference of about 180 degrees.

Consequently, in case of a unit cell designed to have a single-resonance point, strength of second RF signals to be reflected may be weaken depending on an incident value of first RF signals to be incident to the RIS 101 at a target frequency band (e.g., about 28 GHz). For example, if the first RF signal is incident vertically to the RIS 101, the second RF signal to be reflected from the RIS 101 may be transmitted to the second external device 103 (e.g., a UE) with specific strength. On the other hand, if the first RF signal is incident to the RIS 101 with a specific reflection angle (e.g., about 45 degrees), the second RF signal to be reflected from the RIS 101 may be transmitted to the second external device 103 with strength lower than the specific strength. In an example, the specific strength may mean strength configured to achieve communication or target strength.

Referring to FIG. 7A and FIG. 7B, reflection phase graphs depending on a frequency are illustrated when the first unit cell 211 according to an embodiment is designed such that second RF signals to be reflected from the first unit cell 211 have a multi-resonance point. In an embodiment, reflection phase graphs of second RF signals to be reflected may be illustrated variously according to an incident angle of first RF signals to be incident to the RIS 101. For example, third graphs 703 are reflection phase graphs of second RF signals to be reflected from the RIS 101 when the first switch circuit 350 of the first unit cell 211 is turned on. In an example, a plurality of reflection phase graphs are illustrated depending a change in incident angles of the first RF signals to be incident upon the RIS 101.

As another example, fourth graphs 704 are reflection phase graphs of second RF signals to be reflected from the RIS 101 when the first switch circuit 350 of the first unit cell 211 is turned off. In an example, a plurality of reflection phase graphs are illustrated depending a change in incident angles of the first RF signals to be incident to the RIS 101.

According to an embodiment, the third graphs 703 may have a first reflection point 731 at a target frequency (e.g., about 29 GHz). Since the third graphs 703 have the first reflection point 731 at the target frequency (e.g., about 29 GHz), the third graphs 703 may have substantially the same phase value at the target frequency (e.g., about 29 GHz). Likewise, the fourth graphs 704 may have the first resonance point 741 at the target frequency (e.g., about 29 GHz). Since the fourth graphs 704 have a first resonance point 741 at the target frequency (e.g., about 29 GHz), the fourth graphs 704 may have substantially the same phase value at the target frequency (e.g., about 29 GHz). Therefore, if the first unit cell 211 of the RIS 101 is designed such that the second RF signals to be reflected from the first unit cell 211 have a multi-resonance point, irrespective of an incident value of the first RF signals to be incident to the RIS 101, a phase difference between the second RF signals to be reflected when the first switch circuit 350 is turned on and the second RF signals to be reflected when the first switch circuit 350 is turned off may be maintained to be constant.

Consequently, since the first unit cell 211 of the RIS 101 includes the first conductive structure 310 and second conductive structure 320 forming a multi-resonance point, it is possible to minimize or prevent a problem in that the reflection of the second RF signals is not achieved in a direction of a design according to an incident angle of the first RF signals to be incident to the RIS at a target frequency band (e.g., about 28 GHz) or strength of the second RF signals to be reflected is weakened.

Figure 8:
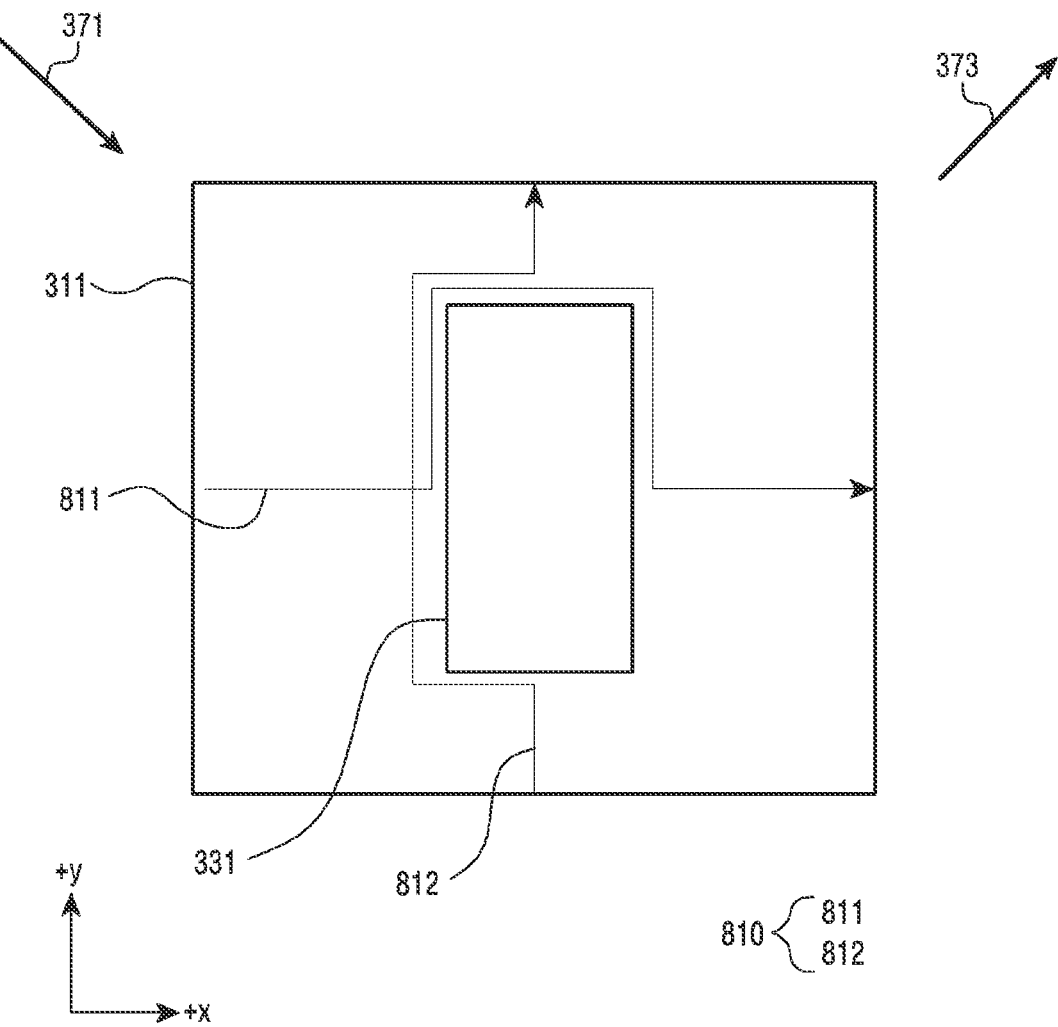
FIG. 8 illustrates first and second polarized waves formed in a first element according to an embodiment.

FIG. 8 illustrates first and second polarized waves formed in a first element according to an embodiment.

Referring to FIG. 8, as the first RF signals 371 from the first external device 102 are incident on the first element 311 according to an embodiment, electrical paths 810 may be formed in the first element 311. For example, a first electrical path 811 may be formed in the first element 311 as the first RF signals 371 are incident. As another example, a second electrical path 812 may be formed in the first element 311 as the first RF signals 371 are incident.

According to an embodiment, a first polarized signal may be formed based on the first electrical path 811, and a second polarized signal may be formed based on the second electrical path 812. For example, the first polarized signal may correspond to horizontal polarization, and the second polarized signal may correspond to vertical polarization. For example, the first polarized signal may have a polarization characteristic of a third direction (e.g., an x-axis direction), and the second polarized signal may have a polarization characteristic of a fourth direction (e.g., a y-axis direction). In an embodiment, the first polarized signal and the second polarization signal may be substantially perpendicular.

According to an embodiment, the first polarized signal and the second polarized signal may have different frequency bands. For example, the first electrical path 811 may have a longer electrical length than the second electrical path 812, and first polarization formed based on the first electrical path 811 may correspond to a signal of a relatively lower frequency band than second polarization formed based on the second electrical path 812.

According to an embodiment, by utilizing the first polarized signal and the second polarized signal, the RIS 101 may transmit to the second external device 103 a relatively greater amount of information than a case where the polarized signal is not utilized.

Figure 9:
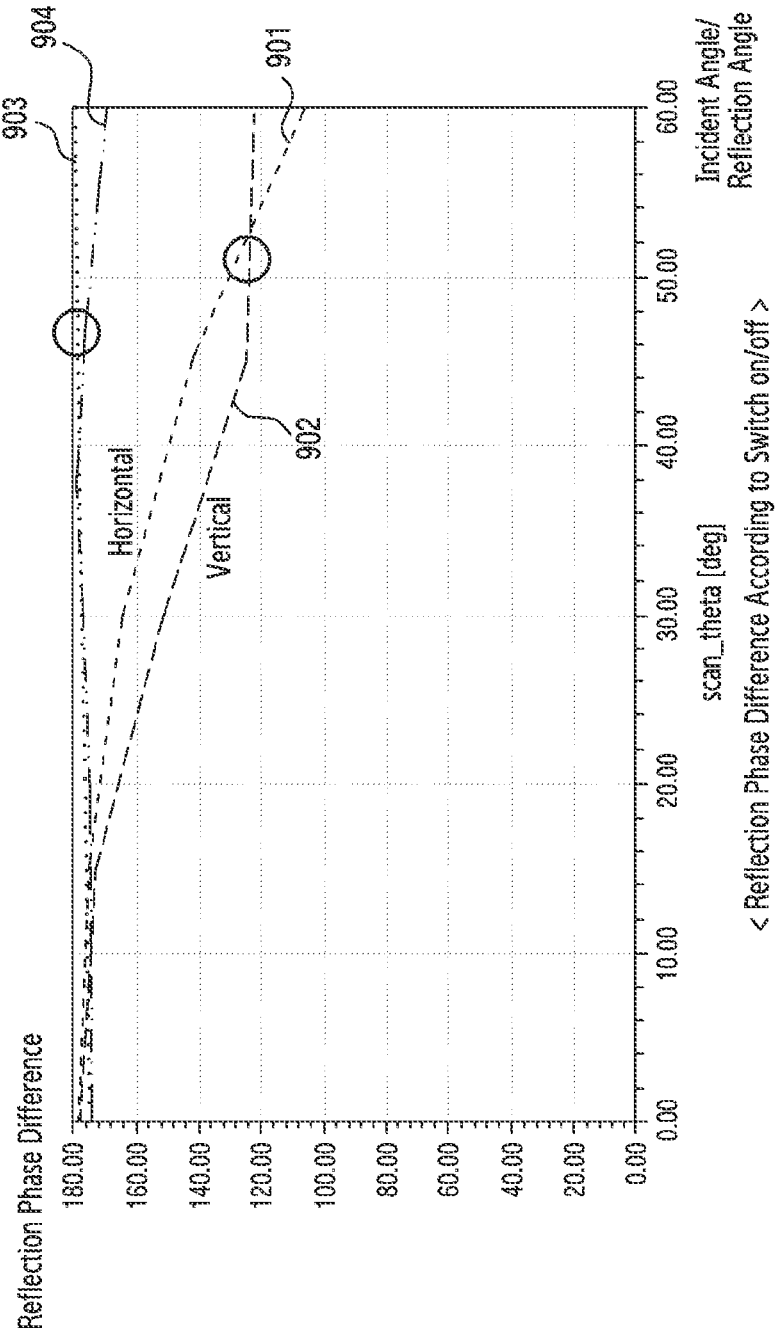
FIG. 9 is a view for comparing a reflection phase difference in each of a unit cell designed to having a single-resonance point and a first unit cell formed to have a multi-resonance point according to an embodiment.

FIG. 9 is a view for comparing a reflection phase difference in each of a unit cell designed to having a single-resonance point and a first unit cell formed to have a multi-resonance point according to an embodiment.

Referring to FIG. 9, a first graph 901 according to an embodiment is a graph of a reflection phase difference depending on an incident angle or reflection angle in a horizontal direction of signals to be incident or reflected from a unit cell designed to have a single-resonance point. For example, the incident angle in the horizontal direction may mean an angle formed between a first RF signal and a specific axis (e.g., the x-axis of FIG. 3) when viewed in a direction (e.g., the −z direction of FIG. 3) perpendicular to one face of the first unit cell 211 against the first RF signal to be incident to the first unit cell (e.g., the first unit cell 211 of FIG. 3). As another example, the incident angle in the horizontal direction may mean an angle formed between a specific axis (e.g., the x-axis) and a first RF signal orthogonally projected, after the first RF signal is orthogonally projected to a plane (e.g., the xy-plane of FIG. 3) parallel to the first unit ell 211 against the first RF signal to be incident to the first unit cell 211.

In addition, the reflection angle in the horizontal direction may mean an angle formed between a second RF signal and a specific axis (e.g., the x-axis of FIG. 3) when viewed in a direction (e.g., the −z direction of FIG. 3) perpendicular to one face of the first unit cell 211 against the second RF signal to be reflected from the first unit cell (e.g., the first unit cell 211 of FIG. 3). As another example, the reflection angle in the horizontal direction may mean an angle formed between a specific axis (e.g., the x-axis) and a second RF signal orthogonally projected, after the second RF signal is orthogonally projected to a plane (e.g., the xy-plane of FIG. 3) parallel to the first unit ell 211 against the second RF signal to be reflected from the first unit cell 211.

A second graph 902 is a phase difference graph depending on an incident angle or reflection angle in a horizontal direction of signals to be incident or reflected from a unit cell designed to have a single-resonance point.

For example, the incident angle in the vertical direction may mean an angle formed between a first RF signal and a specific axis (e.g., the z-axis of FIG. 3) when viewed in a direction (e.g., the +y direction of FIG. 3) horizontal to one face of the first unit cell 211 against the first RF signal to be incident to the first unit cell. As another example, the incident angle in the vertical direction may mean an angle formed between a specific axis (e.g., the x-axis) and a first RF signal orthogonally projected, after the first RF signal is orthogonally projected to a plane (e.g., the xy-plane of FIG. 3) perpendicular to the first unit ell 211 against the first RF signal to be incident to the first unit cell 211.

In addition, the reflection angle in the vertical direction may mean an angle formed between a second RF signal and a specific axis (e.g., the z-axis of FIG. 3) when viewed in a direction (e.g., the +y direction of FIG. 3) horizontal to one face of the first unit cell 211 against the second RF signal to be reflected from the first unit cell. As another example, the reflection angle in the vertical direction may mean an angle formed between a specific axis (e.g., the x-axis) and a second RF signal orthogonally projected, after the second RF signal is orthogonally projected to a plane (e.g., the xy-plane of FIG. 3) vertical to the first unit ell 211 against the second RF signal to be reflected from the first unit cell 211.

According to an embodiment, a third graph 903 is a phase difference graph depending on an incident angle or reflection angle in a horizontal direction of signals to be incident or reflected from the first unit cell 211 designed to have a multi-resonance point. A fourth graph 904 is a reflection phase difference graph depending on an incident angle or reflection angle in a vertical direction of signals to be incident or reflected from the first unit cell 211 designed to have a multi-resonance point.

Referring to the first graph 901 and the second graph 902, a reflection phase difference is gradually decreased with an increase in an incident angle or reflection angle of RF signals to be incident to a unit cell designated to have a single-resonance point. For example, when an incident angle or reflection angle in a horizontal direction is about 50 degrees, a reflection phase difference of signals to be reflected is about 130 degrees. As another example, when an incident angle or reflection angle in a vertical direction is about 50 degrees, a reflection phase difference of signals to be reflected is about 125 degrees. In case of the unit cell designed to have the single-resonance point, a reflection phase difference of signals to be reflected differs from an ideal value, i.e., 180 degrees, by about 50 degrees to about 55 degrees. Consequently, RF signals to be reflected from the unit cell designed to have the single-resonance point may have a problem in that signal strength is weakened.

On the other hand, referring to the third graphs 903 and fourth graph 904 according to an embodiment, a reflection phase difference of signals may be maintained to be constant within a range of about 170 degrees to about 180 degrees irrespective of the incident angle or reflection angle of the RF signals to be incident to the first unit cell 211 designed to have a multi-resonance point. For example, when an incident angle or reflection angle in a horizontal direction is about 45 degrees, a reflection phase difference of signals to be reflected approaches to about 180 degrees. As another example, when (or, in case that) an incident angle or reflection angle in a vertical direction is about 45 degrees, a reflection phase difference of signals to be reflected approaches to about 180 degrees. Therefore, second RF signals to be reflected from the first unit cell 211 designed to have a multi-resonance point may have relatively greater signal strength than RF signals to be reflected from a unit cell designed to have a single-resonance point.

Figure 10:
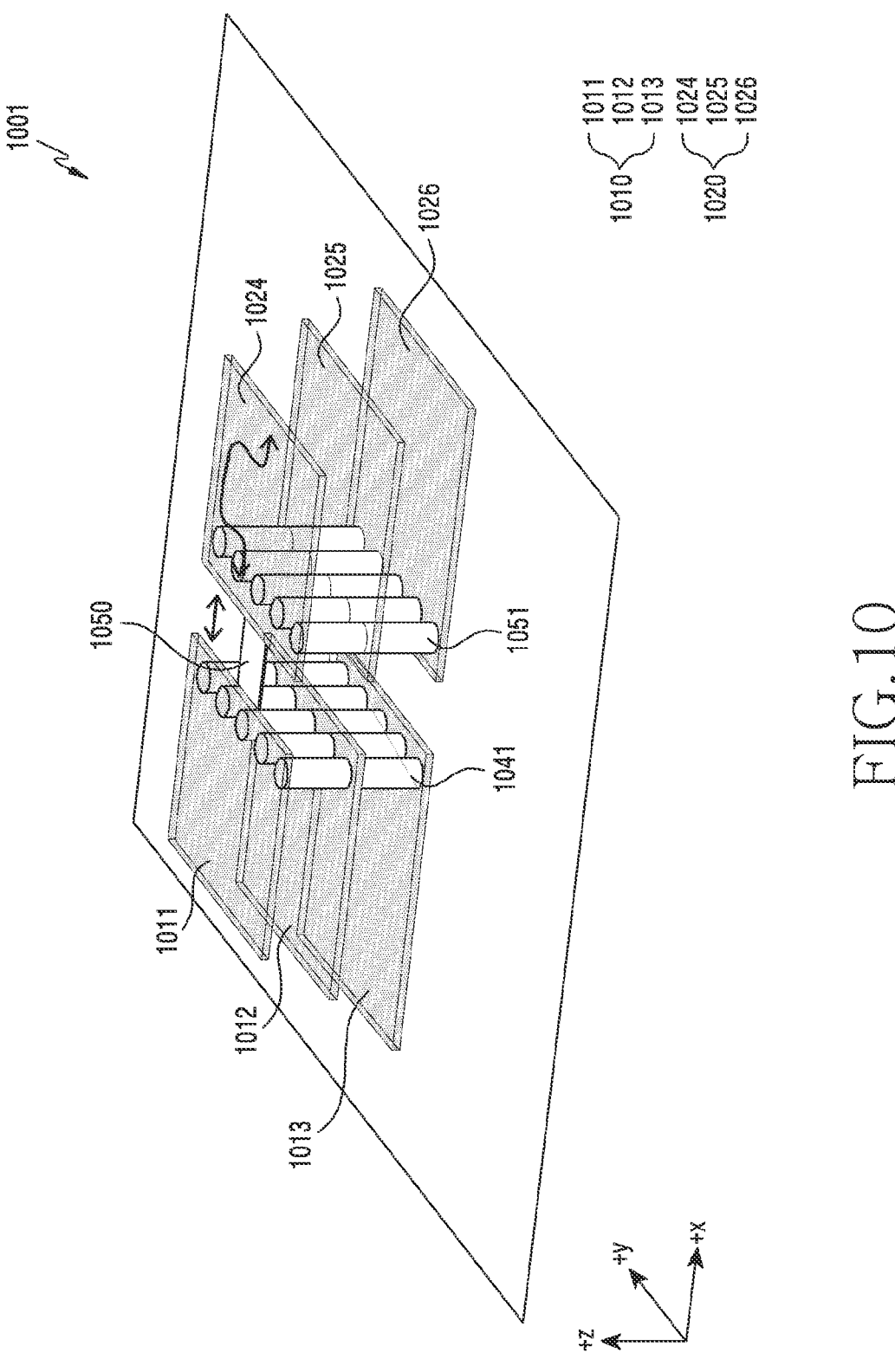
FIG. 10 illustrates a first unit cell of an RIS according to an embodiment.

FIG. 10 illustrates a first unit cell of an RIS according to an embodiment.

Referring to FIG. 10, the RIS 101 according to an embodiment may include a first unit cell 1001. The first unit cell 1001 according to an embodiment may include a first conductive structure 1010, a second conductive structure 1020, first conductive vias 1041, second conductive vias 1051, and/or a first switch circuit 1050. The first conductive vias 1041, second conductive vias 1051, and first switch circuit 1050 illustrated in FIG. 10 may respectively correspond to first conductive vias 341, second conductive vias 351, and first switch circuit 350 illustrated in FIG. 3 in that order. Therefore, descriptions on the first conductive vias 341, second conductive vias 351, and first switch circuit 350 described in FIG. 3 may also be applied, unless there is no conflict thereof, respectively to first conductive vias 1041, second conductive vias 1051, and first switch circuit 1050 of FIG. 10.

Unlike the elements of the first conductive structure 310 and the elements of the second conductive structure illustrated in FIG. 3, elements of the first conductive structure 1010 and elements of the second conductive structure 1020 illustrated in FIG. 10 may have different sizes. For example, a first element 1011 may have a smaller size than a second element 1012, and the second element 1012 may have a smaller size than a third element 1013. As another example, a fourth element 1024 may have a smaller size than a fifth element 1025, and the fifth element 1025 may have a smaller size than a sixth element 1026.

Unlike the elements of the first conductive structure 310 and the elements of the second conductive structure 320 illustrated in FIG. 3, elements of the first conductive structure 1010 and elements of the second conductive structure 1020 illustrated in FIG. 10 may not include a slot. For example, unlike the first element 311 of FIG. 3, the first element 1011 may not include the slot.

According to an embodiment, even if the first conductive structure 1010 and the second conductive structure 1020 do not include the slot, since the first conductive structure 1010 and the second conductive structure 1020 have elements each of which has a different size, second RF signals to be reflected from the first unit cell 1001 may have a multi-resonance point. For example, since the first element 1011 has a smaller size than the second element 1012, a length of a first electrical path formed in the first element 1011 may be shorter than a length of a second electrical path formed in the second element 1012. Therefore, a first RF signal formed based on the first electrical path may have a higher resonance frequency than the second RF signal formed based on the second electrical path longer than the first electrical path. Similarly, since the second element 1012 has a smaller size than the third element 1013, the length of the second electrical path formed in the second element 1012 may be shorter than a length of a third electrical path formed in the third element 1013. Therefore, the second RF signal formed based on the second electrical path may have a higher resonance frequency than the third RF signal formed based on the third electrical path. Consequently, since the first element 1011, the second element 1012, and the third element 1013 have different sizes, RF signals having a multi-resonance frequency may be formed. In addition, descriptions on the first element 1011, the second element 1012, and the third element 1013 may also substantially equally apply to the fourth element 1024, the fifth element 1025, and the sixth element 1026.

Although it is described in FIG. 10 that the first element 1011 and the fourth element 1024 have substantially the same size, this is only an example, and the first element 1011 and the fourth element 1024 may have different sizes. Likewise, the second element 1012 and the fifth element 1025 may have different sizes. The third element 1013 and the sixth element 1026 may have different sizes. That is, elements located in a left direction (e.g., a –x direction) with respect to the first switch circuit 1050 and elements located in a right direction (e.g., a +x direction) with respect to the first switch circuit 1050 may not be symmetric to each other.

Although it is described in FIG. 10 that elements of the first conductive structure 310 and elements of the second conductive structure 320 may have different sizes instead of a slot formed in the first conductive structure 310 and second conductive structure 320, this is for convenience of description. Therefore, in another embodiment, each of elements of the first conductive structure 310 and second conductive structure 320 may have different sizes and may also have a slot. That is, in another embodiment, the RIS 101 may implement a multi-frequency band by adjusting all sizes of the elements and slot.

A conductive structure of the disclosure may be referred to as a hardware component. The conductive structure of the disclosure may be referred to as a component including a conductive material.

The conductive structure of the disclosure may be replaced with various terms referring to an object including the conductive material. For example, the conductive structure may be replaced with a conductive plate, a conductive patch, or a reflector including the conductive material. As another example, the conductive structure may be replaced with an antenna or a radiator.

An element included in the conductive structure of the disclosure may be referred to as a hardware component. The element of the disclosure may be referred to as a component including the conductive material.

The element of the disclosure is included in the conductive structure, and may be replaced with various terms referring to an object including the conductive material. For example, a first element included in a first conductive structure may be replaced with a first conductive plate, a first conductive patch, or a first reflector including the conductive material. As another example, the element may be replaced with an antenna element or a radiator.

Figure 11:
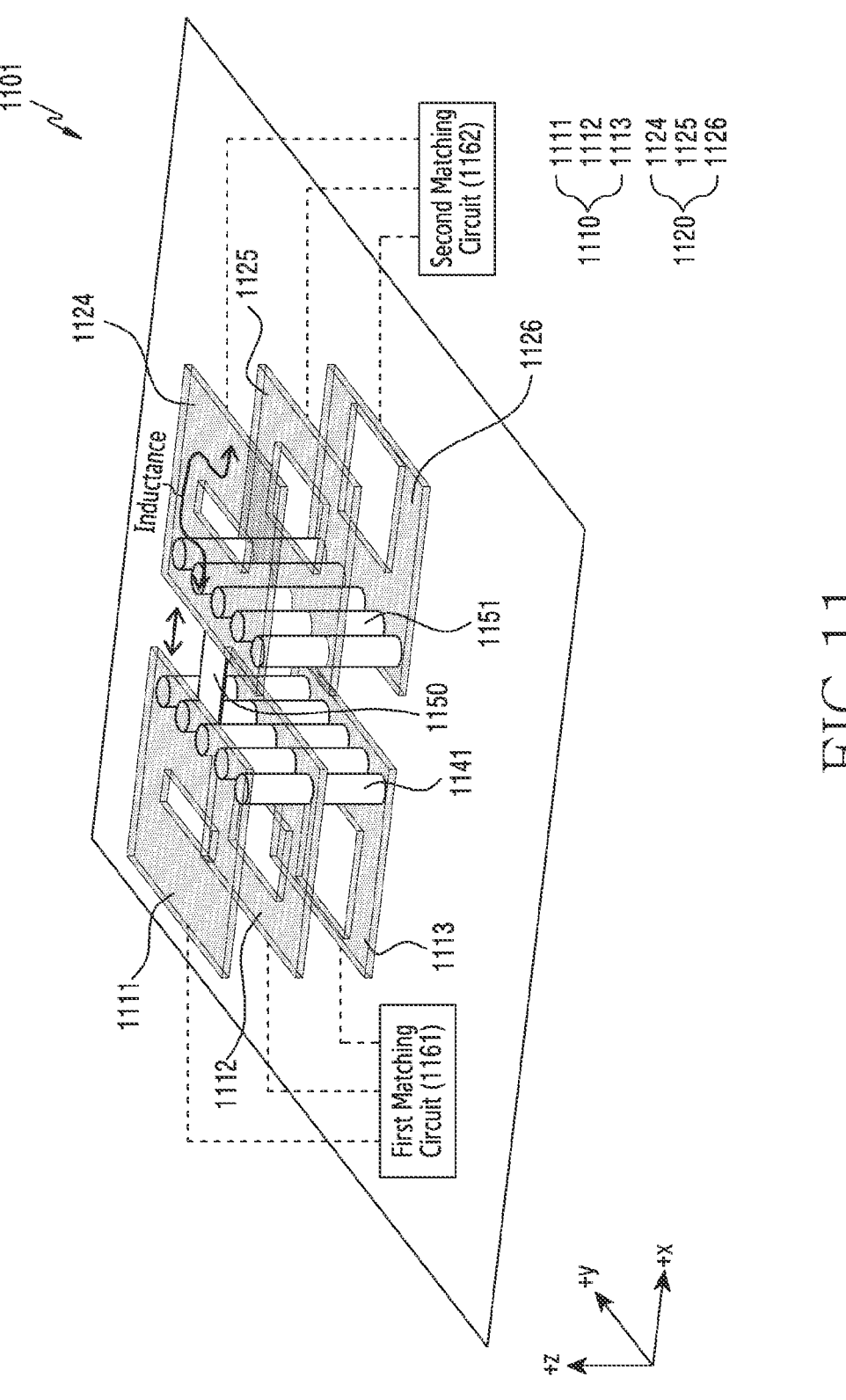
FIG. 11 illustrates a first unit cell of an RIS according to an embodiment.

FIG. 11 illustrates a first unit cell of an RIS according to an embodiment.

Referring to FIG. 11, the RIS 101 according to an embodiment may include a first unit cell 1101. The first unit cell 1101 according to an embodiment may include a first conductive structure 1110, a second conductive structure 1120, first conductive vias 1141, second conductive vias 1151, and/or a first switch circuit 1150. The first conductive structure 1110, second conductive structure 1120, first conductive vias 1141, second conductive vias 1151, and first switch circuit 1150 illustrated in FIG. 11 may respectively correspond to the first conducive structure 310, second conductive structure 320, first conductive vias 341, second conductive vias 351, and first switch circuit 350 illustrated in FIG. 3 in that order. Therefore, descriptions on the first conductive structure 310, second conductive structure 320, first conductive vias 341, second conductive vias 351, and first switch circuit 350 described in FIG. 3 may also be applied, unless there is no conflict thereof, respectively to the first conductive structure 1110, second conductive structure 1120, first conductive vias 1141, second conductive vias 1151, and first switch circuit 1150 of FIG. 11.

According to an embodiment, the first unit cell 1101 may further include a first matching circuit 1161 and/or a second matching circuit 1162, unlike the first unit cell 211 illustrated in FIG. 3. In an embodiment, the first matching circuit 1161 and/or the second matching circuit 1162 may include at least one switch and/or a lumped element (e.g., an inductor, a capacitor).

According to an embodiment, the at least one processor 220 may be electrically coupled to the first matching circuit 1161 and/or the second matching circuit 1162. The at least one processor 220 may adjust the first conductive structure 310 and the second conductive structure 320 respectively through the first matching circuit 1161 and/or the second matching circuit 1162. In an embodiment, since respective impedances of the first conductive structure 310 and second conductive structure 320 are adjusted by the first matching circuit 1161 and/or the second matching circuit 1162, second RF signals to be reflected from the first unit cell 1101 may have multiple frequencies.

For example, the at least one processor 220 may control the first matching circuit 1161 so that a lumped element (e.g., an inductor, a capacitor) is electrically coupled to a first element 1111. Since the lumped element is electrically coupled to the first element 1111, an electrical length of a first electrical path formed in the first element 1111 may vary. Accordingly, a resonance frequency band of a first RF signal formed based on the first electrical path may be shifted. Consequently, the RIS 101 may use the first match circuit 1161 and/or the second matching circuit 1162 to shift a resonance frequency of second RF signals to be reflected, and may implement a multi-frequency band. According to an embodiment, the at least one processor 220 may perform matching by adjusting a structure of an element through the first matching circuit 1161 and/or the second matching circuit 1162. For example, the at least one processor 220 may control the first matching circuit 1161 so that the lumped element is electrically coupled to the first element 1111. Since the lumped element is coupled to the first element 1111, a structure (e.g., an electrical structure) of the first element 1111 may be adjusted, and matching may be performed.

For example, the at least one processor 220 may control the second matching circuit 1162 so that the lumped element is electrically coupled to a fourth element 1124. Since the lumped element is coupled to the fourth element 1124, a structure (e.g., an electrical structure) of the fourth element 1124 may be adjusted, and matching may be performed.

The aforementioned description on the first element 1111 may also substantially equally apply to a second element 1112, a third element 1113, the fourth element 1124, a fifth element 1115, and a sixth element 1116.

Although it is described in FIG. 11 under the premise that elements included in the first conductive structure 1110 and second conductive structure 1120 have the same size, this is for convenience of description. Therefore, in another embodiment, each of the elements of the first conductive structure 1110 and second conductive structure 1120 may have a different size and have a different electrical path due to a matching circuit. That is, a combination of the embodiment of FIG. 10 and the embodiment of FIG. 11 is possible in another embodiment.

Figure 12:
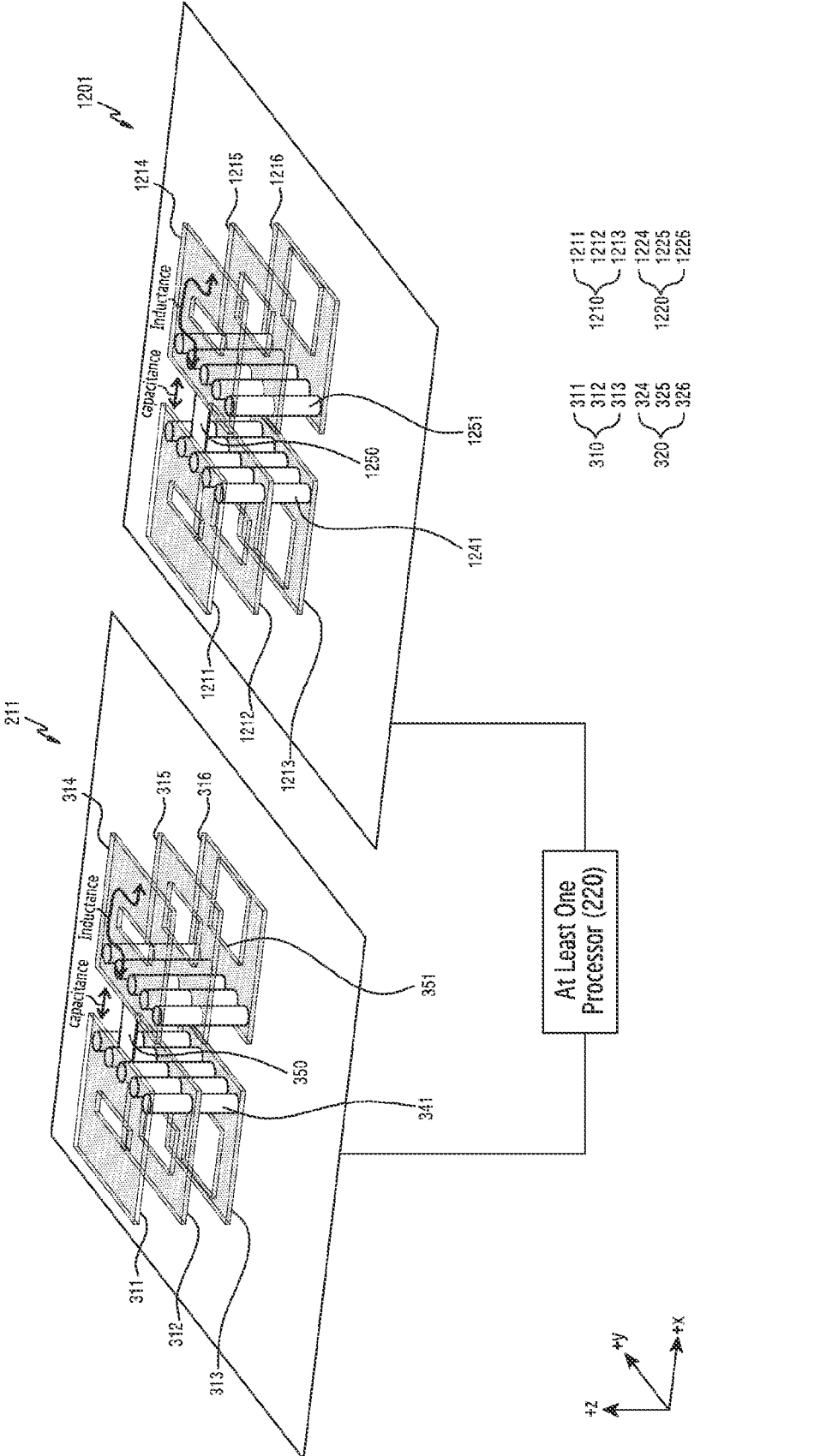
FIG. 12 illustrates a first unit cell and second unit cell of an RIS according to an embodiment.

FIG. 12 illustrates a first unit cell and second unit cell of an RIS according to an embodiment.

Referring to FIG. 12, the RIS 101 according to an embodiment may include the first unit cell 211 and a second unit cell 1201. In an embodiment, the second unit cell 1201 may include a component substantially the same component as that of the first unit cell 211. In an embodiment, the second unit cell 1201 may correspond to a unit cell adjacent to the first unit cell 211. For example, the second unit cell 1201 may correspond to a unit cell located in a right direction (e.g., a +x direction) of the first unit cell 211.

According to an embodiment, the second unit cell 1201 may include a third conductive structure 1210, a fourth conductive structure 1220, third conductive vias 1241, fourth conductive vias 1251, and/or a second switch circuit 1250. In an embodiment, the third conductive structure 1210 may include a first element 1211, a second element 1212, and/or a third element 1213. The fourth conductive structure 1220 may include a fourth element 1224, a fifth element 1225, and/or a sixth element 1226.

The third conductive structure 1210, fourth conductive structure 1220, third conductive vias 1241, fourth conductive vias 1251, and second switch circuit 1250 illustrated in FIG. 12 may respectively correspond to the first conducive structure 310, second conductive structure 320, first conductive vias 341, second conductive vias 351, and first switch circuit 350 of the first unit cell 211 in that order. Therefore, descriptions on the first conductive structure 310, second conductive structure 320, first conductive vias 341, second conductive vias 351, and first switch circuit 350 described in FIG. 3 may also be applied respectively to the third conductive structure 1210, fourth conductive structure

1220, third conductive vias 1241, fourth conductive vias 1251, and second switch circuit 1250 of the second unit cell 1201.

According to an embodiment, the at least one processor 220 may be electrically coupled to the first unit cell 211 and the second unit cell 1201. For example, the at least one processor 220 may be electrically coupled (or, connected) to the first switch circuit 350 of the first unit cell 211 and the second switch circuit 1250 of the second unit cell 1201.

According to an embodiment, the at least one processor 220 may control an electrical connection relationship of the first conductive structure 310 and second conductive structure 320 by controlling the first switch circuit 350. For example, the at least one processor 220 may electrically couple the first conductive structure 310 and the second conductive structure 320 by turning on (or short-circuiting) the first switch circuit 350. As another example, the at least one processor 220 may not electrically couple the first conductive structure 310 and the second conductive structure 320 by turning off (or open-circuiting) the second switch circuit 1250.

According to an embodiment, the at least one processor 220 may control an electrical connection relationship of the third conductive structure 1210 and fourth conductive structure 1220 by controlling the second switch circuit 1250. For example, the at least one processor 220 may electrically couple the third conductive structure 1210 and the fourth conductive structure 1220 by turning on (or short-circuiting) the second switch circuit 1250. As another example, the at least one processor 220 may not electrically couple the third conductive structure 1210 and the fourth conductive structure 1220 by turning off (or open-circuiting) the second switch circuit 1250.

According to an embodiment, the at least one processor 220 may electrically couple the first conductive structure 310 and the second conductive structure 320 by controlling the first switch circuit 350, and may electrically decouple the third conductive structure 1210 and the fourth conductive structure 1220 by controlling the second switch circuit 1250. In an embodiment, with the incidence of a first RF signal from the first external device 102 to the first unit cell 211, a second RF signal to be reflected from the first conductive structure 310 and the second conductive structure 320, which are coupled to each other, may have a first phase. In an embodiment, with the incidence of a third RF signal from the first external device 102 to the second unit cell 1201, a fourth RF signal to be reflected from the third conductive structure 1210 and the fourth conductive structure 1220, which are not coupled to each other, may have a second phase. In an embodiment, the second phase may be different from the first phase. For example, the second phase may be different by about 180 degrees from the first phase.

According to an embodiment, the at least one processor 220 turns on the first switch circuit 350 of the first unit cell 211 and turns off the second switch circuit 1250 of the second unit cell 1201 adjacent to the first unit cell 211. Thus, the RIS 101 may adjust a reflection direction of an RF signal to be reflected.

Although it is described in an embodiment of FIG. 12 that the first switch circuit 350 is turned on and the second switch circuit 1250 is turned off, this is only an example. In another embodiment, the at least one processor 220 may turn on the first switch circuit 350 and turns off the second switch circuit 1250.

Although it is described in the disclosure that the first switch circuit 350 and the second switch circuit 1250 are controlled by the at least one processor 220, this is only an example. In another embodiment, the first switch circuit 350 and/or the second switch circuit 1250 may be turned on or off autonomously without the control of the at least one processor 220.

A unit cell of a Reconfigurable Intelligent Surface (RIS) according to various embodiments of the disclosure may include a first conductive structure including a first element and a second element disposed under the first element, a second conductive structure including a third element and a fourth element disposed under the third element, and a switch circuit disposed between the first conductive structure and the second conductive structure. With the incidence of a first Radio Frequency (RF) signal from a first external device to the unit cell, a second RF signal having a first resonance frequency may be reflected based on electrical paths formed respectively in the first element and the third element. A third RF signal having a second resonance frequency different from the first resonance frequency may be reflected based on electrical paths formed respectively in the second element and the fourth element. The first element and the second element may be electrically coupled (or, connected) to each other. The third element and the fourth elements may be electrically coupled (or, connected) to each other.

According to an embodiment, the unit cell may further include a first conductive via which electrically couples the first element and the second element, and a second conductive via which electrically couples the third element and the fourth element.

According to an embodiment, a first slot formed in the first element may be different in size from a second slot formed in the second element.

According to an embodiment, the first slot may be greater in size than the second slot.

According to an embodiment, in the unit cell, the first conductive structure may further include a fifth element disposed under the second element and electrically coupled (or, connected) to the first element and the second element. The second conductive structure may further include a sixth element disposed under the fourth element and electrically coupled (or, connected) to the third element and the fourth element.

According to an embodiment, the unit cell may further include at least one processor electrically coupled to the switch circuit. The at least one processor may control the first conductive structure and the second conductive structure through the switch circuit.

According to an embodiment, when (or, in case that) the first conductive structure and the second conductive structure are electrically coupled through the switch circuit, with the incidence of the first RF signal from the first external device to the unit cell, a fourth RF signal to be reflected from the first conductive structure and the second conductive structure may have a first phase. When (or, in case that) the first conductive structure and the second conductive structure are not electrically coupled (or, connected) through the switch circuit, with the incidence of the first RF signal from the first external device to the unit cell, a fifth RF signal to be reflected from the first conductive structure and the second conductive structure may have a second phase different from the first phase.

According to an embodiment, the first phase and the second phase may have a difference of 180 degrees.

According to an embodiment, with the incidence of the first RF signal from the first external device to the unit cell, a first polarized signal of a first direction and a second polarized signal of a second direction substantially perpendicular to the first direction may be reflected from the first conductive structure and the second conductive structure.

According to an embodiment, the second RF signal having the first resonance frequency and the third RF signal having the second resonance frequency may be transmitted to a second external device.

According to an embodiment, the first conductive structure and the second conductive structure may be disposed at least in part inside a dielectric.

According to an embodiment, the switch circuit may include a first switch which electrically couples the first element and the third element, and a second switch which electrically couples the second element and the fourth element.

According to an embodiment, the first element may correspond to a first conductive patch. The second element may correspond to a second conductive patch. The third element may correspond to a third conductive patch. The fourth element may correspond to a fourth conductive patch.

According to an embodiment, with the incidence of the first RF signal from the first external device to the unit cell, a first electrical path formed in the first element may have an electrical length different from that of a second electrical path formed in the second element.

According to an embodiment, the first element may be different in size from the second element. The third element may be different in size from the fourth element.

A Reconfigurable Intelligent Surface (RIS) according to various embodiments may include a first unit cell including a first conductive structure including a first element and a second element disposed under the first element, a second conductive structure including a third element and a fourth element disposed under the third element, and a switch circuit disposed between the first conductive structure and the second conductive structure. With the incidence of an RF signal from a first external device to the first unit cell, a second RF signal having a first resonance frequency may be reflected based on electrical paths formed respectively in the first element and the third element. A third RF signal having a second resonance frequency different from the first resonance frequency may be reflected based on electrical paths formed respectively in the second element and the fourth element. The first element and the second element may be electrically coupled to each other. The third element and the fourth elements may be electrically coupled to each other.

According to an embodiment, the RIS may further include a second unit cell. The second unit cell may include a third conductive structure including a fifth element and a sixth element disposed under the fifth element, a fourth conductive structure including a seventh element and an eighth element disposed under the seventh element, and a second switch circuit disposed between the third conductive structure and the fourth conductive structure. The fifth element and the sixth element may be electrically coupled to each other. The seventh element and the eighth element may be electrically coupled to each other.

According to an embodiment, the RIS may further include at least one processor electrically coupled to the first switch circuit and the second switch circuit. The at least one processor may control the first switch circuit so that the first conductive structure and the second conductive structure are electrically coupled, and may control the second switch circuit so that the third conductive structure and the fourth conductive structure are not electrically coupled.

According to an embodiment, with the incidence of the first RF signal from the first external device to the first unit cell, a fourth RF signal to be reflected from the first conductive structure and the second conductive structure may have a first phase. With the incidence of a fifth RF signal from the first external device to the second unit cell, a sixth RF signal to be reflected from the third conductive structure and the fourth conductive structure may have a second phase different from the first phase.

According to an embodiment, a first slot formed in the first element may be different in size from a second slot formed in the second element.

Although the present disclosure has been described with various embodiments, various changes and modifications may be suggested to one skilled in the art. It is intended that the present disclosure encompass such changes and modifications as fall within the scope of the appended claims.

What is claimed is:

1. A unit cell of a reconfigurable intelligent surface (RIS), the unit cell comprising:
   a first conductive structure comprising a first conductive element and a second conductive element, wherein the first conductive element and the second conductive element are electrically connected with each other;
   a second conductive structure comprising a third conductive element and a fourth conductive element, wherein the third conductive element and the fourth conductive element are electrically connected with each other; and
   a switch circuit selectively connecting the first conductive structure and the second conductive structure,
   wherein, in case that a signal from a first external device is incident on the unit cell,
   a first reflected signal is formed based on electrical paths formed in the first conductive structure, and a second reflected signal is formed based on electrical paths formed in the second conductive structure, and
   wherein the switch circuit is configured to adjust phases of the first reflected signal and the second reflected signal by selectively connecting the first conductive structure and the second conductive structure.

2. The unit cell of claim 1, further comprising:
   a first conductive via electrically connecting the first conductive element and the second conductive element; and
   a second conductive via electrically connecting the third conductive element and the fourth conductive element.

3. The unit cell of claim 1, wherein a size of a first slot formed in the first conductive element is different from a size of a second slot formed in the second conductive element.

4. The unit cell of claim 3, wherein the size of the first slot is greater than the size of the second slot.

5. The unit cell of claim 1,
   wherein the first conductive structure further comprises a fifth conductive element electrically connected with the first conductive element and the second conductive element,
   wherein the second conductive structure further comprises a sixth conductive element electrically connected with the third conductive element and the fourth conductive element,
   wherein the second conductive element is disposed between the first conductive element and the fifth conductive element, and wherein the fourth conductive element is disposed between the third conductive element and the sixth conductive element.

6. The unit cell of claim 1, further comprising:
at least one processor electrically connected with the switch circuit, and configured to control the first conductive structure and the second conductive structure through the switch circuit.

7. The unit cell of claim 1, wherein, in case that the first conductive structure and the second conductive structure are electrically connected through the switch circuit, the first reflected signal has a first phase and the second reflected signal has a second phase, and
wherein, in case that the first conductive structure and the second conductive structure are not electrically connected through the switch circuit, the first reflected signal has a third phase different from the first phase and the second reflected signal has a fourth phase different from the second phase.

8. The unit cell of claim 7, wherein a difference between the first phase and the third phase is 180 degrees.

9. The unit cell of claim 1, wherein, in case that the signal from the first external device is incident on the unit cell, a first polarized signal of a first direction and a second polarized signal of a second direction substantially perpendicular to the first direction are reflected from the first conductive structure and the second conductive structure.

10. The unit cell of claim 1, wherein the first reflected signal and the second reflected signal are transmitted to a second external device.

11. The unit cell of claim 1, wherein at least a portion of the first conductive structure and at least a portion of the second conductive structure are disposed in a dielectric.

12. The unit cell of claim 1, wherein the switch circuit comprises:
a first switch electrically connecting the first conductive element and the third conductive element; and
a second switch electrically connecting the second conductive element and the fourth conductive element.

13. The unit cell of claim 1, wherein the first conductive element corresponds to a first conductive patch,
wherein the second conductive element corresponds to a second conductive patch,
wherein the third conductive element corresponds to a third conductive patch, and
wherein the fourth conductive element corresponds to a fourth conductive patch.

14. The unit cell of claim 1, wherein, in case that the signal from the first external device is incident on the unit cell, a first electrical path formed in the first conductive element has a first electrical length different from a second electrical length of a second electrical path formed in the second conductive element.

15. The unit cell of claim 1,
wherein a size of the first conductive element is different from a size of the second conductive element, and
wherein a size of the third conductive element is different from a size of the fourth conductive element.

16. A reconfigurable intelligent surface (RIS) comprising:
a plurality of unit cells comprising a first unit cell, wherein the first unit cell comprises:
a first conductive structure comprising a first conductive element and a second conductive element, wherein the first conductive element and the second conductive element are electrically connected with each other;
a second conductive structure comprising a third conductive element and a fourth conductive element, wherein the third conductive element and the fourth conductive element are electrically connected with each other; and
a first switch circuit selectively connecting the first conductive structure and the second conductive structure,
wherein, in case that a signal from a first external device is incident on the first unit cell, a first reflected signal is formed based on electrical paths formed in the first conductive structure, and a second reflected signal is formed based on electrical paths formed in the second conductive structure, and
wherein the first switch circuit is configured to adjust phases of the first reflected signal and the second reflected signal by selectively connecting the first conductive structure and the second conductive structure.

17. The RIS of claim 16, further comprising:
a second unit cell, wherein the second unit cell comprises:
a third conductive structure comprising a fifth conductive element and a sixth conductive element, wherein the fifth conductive element and the sixth conductive element are electrically connected with each other;
a fourth conductive structure comprising a seventh conductive element and an eighth conductive element, wherein the seventh conductive element and the eighth conductive element are electrically connected with each other; and
a second switch circuit selectively connecting the third conductive structure and the fourth conductive structure.

18. The RIS of claim 17, further comprising:
at least one processor electrically connected with the first switch circuit and the second switch circuit,
wherein the at least one processor is configured to:
control the first switch circuit such that the first conductive structure and the second conductive structure are electrically connected; and
control the second switch circuit such that the third conductive structure and the fourth conductive structure are not electrically connected.

19. The RIS of claim 16, wherein a first slot formed in the first conductive element is different in size from a second slot formed in the second conductive element.

20. The unit cell of claim 1, wherein the electrical paths formed in the first conductive structure correspond to different resonance frequencies, and
wherein the electrical paths formed in the second conductive structure correspond to different resonance frequencies.

* * * * *